（12） United States Patent
Huang et al.

(10) Patent No.: US 11,223,393 B2
(45) Date of Patent: Jan. 11, 2022

(54) INITIATOR DEVICE, RESPONDER DEVICE, AND SYSTEM

(71) Applicant: Panasonic Intellectual Property Corporation of America, Torrance, CA (US)

(72) Inventors: Lei Huang, Singapore (SG); Hiroyuki Motozuka, Kanagawa (JP); Takenori Sakamoto, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 16/757,215

(22) PCT Filed: Oct. 17, 2018

(86) PCT No.: PCT/JP2018/038686
§ 371 (c)(1),
(2) Date: Apr. 17, 2020

(87) PCT Pub. No.: WO2019/078261
PCT Pub. Date: Apr. 25, 2019

(65) Prior Publication Data
US 2021/0126678 A1    Apr. 29, 2021

Related U.S. Application Data

(60) Provisional application No. 62/628,199, filed on Feb. 8, 2018, provisional application No. 62/575,264, filed on Oct. 20, 2017.

(30) Foreign Application Priority Data

Sep. 14, 2018    (JP) .............................. JP2018-172815

(51) Int. Cl.
*H04B 7/0413* (2017.01)
*H04B 1/38* (2015.01)
*H04B 7/06* (2006.01)

(52) U.S. Cl.
CPC ............. *H04B 7/0413* (2013.01); *H04B 1/38* (2013.01); *H04B 7/0617* (2013.01); *H04B 7/0632* (2013.01); *H04B 7/0686* (2013.01)

(58) Field of Classification Search
CPC ... H04W 84/12; H04B 7/0417; H04B 7/0695; H04B 7/0452; H04B 7/0617; H04B 7/0636; H04B 7/06
(Continued)

(56) References Cited

U.S. PATENT DOCUMENTS

2020/0044724 A1\*  2/2020  Kim .......................... H04L 1/00
2020/0382185 A1\* 12/2020  Park ..................... H04B 7/0613
2021/0028839 A1\*  1/2021  Oteri .................... H04B 7/0617

OTHER PUBLICATIONS

International Search Report, dated Jan. 15, 2019, for International Application No. PCT/JP2018/038686, 4 pages.
(Continued)

*Primary Examiner* — Leila Malek
(74) *Attorney, Agent, or Firm* — Seed IP Law Group LLP

(57) ABSTRACT

An initiator device is provided with a generation circuit for supporting Single User (SU)-Multiple Input Multiple Output (MIMO) operation and generating a first signal including a value that indicates which of a reciprocal MIMO phase and a non-reciprocal MIMO phase is to be applied to SU-MIMO BF training, and a transmission circuit for transmitting the first signal to a responder device. The responder device is provided with a reception circuit for receiving the first signal from the initiator device, and a processing circuit for determining on the basis of the value which of the reciprocal MIMO phase and the non-reciprocal MIMO phase is to be applied to SU-MIMO BF training.

15 Claims, 22 Drawing Sheets

(58) Field of Classification Search
USPC .......................................................... 375/267
See application file for complete search history.

(56) References Cited

OTHER PUBLICATIONS

Kome Oteri et al., "Hybrid Beamforming for SC and OFDM Transmission in 11ay," IEEE 802.11-17/1533r0, IEEE, Sep. 25, 2017, 27 pages.

Lei Huang et al., "MU-MIMO BF selection," IEEE 802.11-17/1184r2, Aug. 2017, 10 pages.

Lei Huang et al., "Comment Resolution on SU-MIMO & MU-MIMO BF Training and Feedback," IEEE 802.11-17/1041r0, Jul. 2017, 16 pages.

Ou Yang et al., "3.1.4 MIMO Channel Access," IEEE 802.11-16/1620r2, Jan. 2017, 6 pages.

"IEEE Standard for Information technology—Telecommunications an information exchange between systems, Local and metropolitan area networks—specification requirements, Part 11: Wireless LAN Medium Access Control (MAC) and Physical Layer (PHY) Specifications," Section 10,38 beamforming, IEEE Std 802.11™-2016, Dec. 2016, 3534 pages.

802.11 Working Group of the Lan/Man Standards Committee, "Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 7: Enhanced throughput for operation in license-exempt bands above 45 GHz," IEEE P802.11ay™/D0.5, Aug. 2017, 348 pages.

Extended European Search Report, dated Oct. 22, 2020, for European Application No. 18868560.6-1220, 8 pages.

Huang et al., Panasonic, "SU-MIMO beamforming optimization," IEEE 802.11-17/1233R0, IEEE P802.11, Wireless LANs, Dec. 6, 2017, 7 pages.

* cited by examiner

FIG. 4

| ORDER | INFORMATION |
|---|---|
| 1 | CATEGORY |
| 2 | UNPROTECTED DMG ACTION |
| 3 | DIALOG TOKEN |
| 4 | MIMO SETUP CONTROL ELEMENT |

FIG. 5

| FIELD | SIZE (BITS) | MEANING |
|---|---|---|
| ELEMENT ID | 8 | |
| LENGTH | 8 | |
| ELEMENT ID EXTENSION | 8 | |
| SU/MU | 1 | SET TO 1 TO INDICATE SU-MIMO BF AND SET TO 0 TO INDICATE MU-MIMO BF. |
| NON-RECIPROCAL/RECIPROCAL SU-MIMO PHASE | 1 | SET TO 1 TO INDICATE NON-RECIPROCAL MIMO PHASE AND SET TO 0 TO INDICATE RECIPROCAL MIMO PHASE. THIS FIELD IS RESERVED WHEN THE SU/MU FIELD IS SET TO 0. |
| EDMG GROUP ID | 8 | INDICATES EDMG GROUP ID OF TARGET MU GROUP. THIS FIELD IS RESERVED WHEN THE SU/MU FIELD IS SET TO 1. |
| GROUP USER MASK | 32 | |
| DL/UL MU-MIMO PHASE | 1 | SET TO 1 TO INDICATE DOWNLINK MIMO PHASE AND SET TO 0 TO INDICATE UPLINK MIMO PHASE. THIS FIELD IS RESERVED WHEN THE SU/MU FIELD IS SET TO 1. |
| L-TX-RX | 8 | INDICATES THE REQUESTED NUMBER OF CONSECUTIVE TRN UNITS IN WHICH THE SAME AWV IS USED IN THE TRANSMISSION OF THE LAST M TRN SUBFIELDS OF EACH TRN UNIT. THIS FIELD IS RESERVED WHEN THE SU/MU FIELD IS SET TO 0. |
| REQUESTED EDMG TRN UNIT M | 4 | THE VALUE OF THIS FIELD PLUS ONE INDICATES THE REQUESTED NUMBER OF TRN SUBFIELDS IN A TRN UNIT TRANSMITTED WITH THE SAME AWV FOLLOWING A POSSIBLE AWV CHANGE. THIS FIELD IS RESERVED WHEN THE SU/MU FIELD IS SET TO 0. |
| LINK TYPE | 1 | SET TO 1 TO INDICATE INITIATOR LINK AND SET TO 0 OTHERWISE. THIS FIELD IS SET TO 1 WHEN THE SU/MIMO FIELD IS SET TO 0. |
| TRANSMISSION POWER | 5 | |
| MIMO FBCK-REQ | 10 | INDICATES CHANNEL MEASUREMENT FEEDBACK REQUESTED FOR THE LINK DESIGNATED BY THE LINK TYPE FIELD. |
| RESERVED | 1 | |

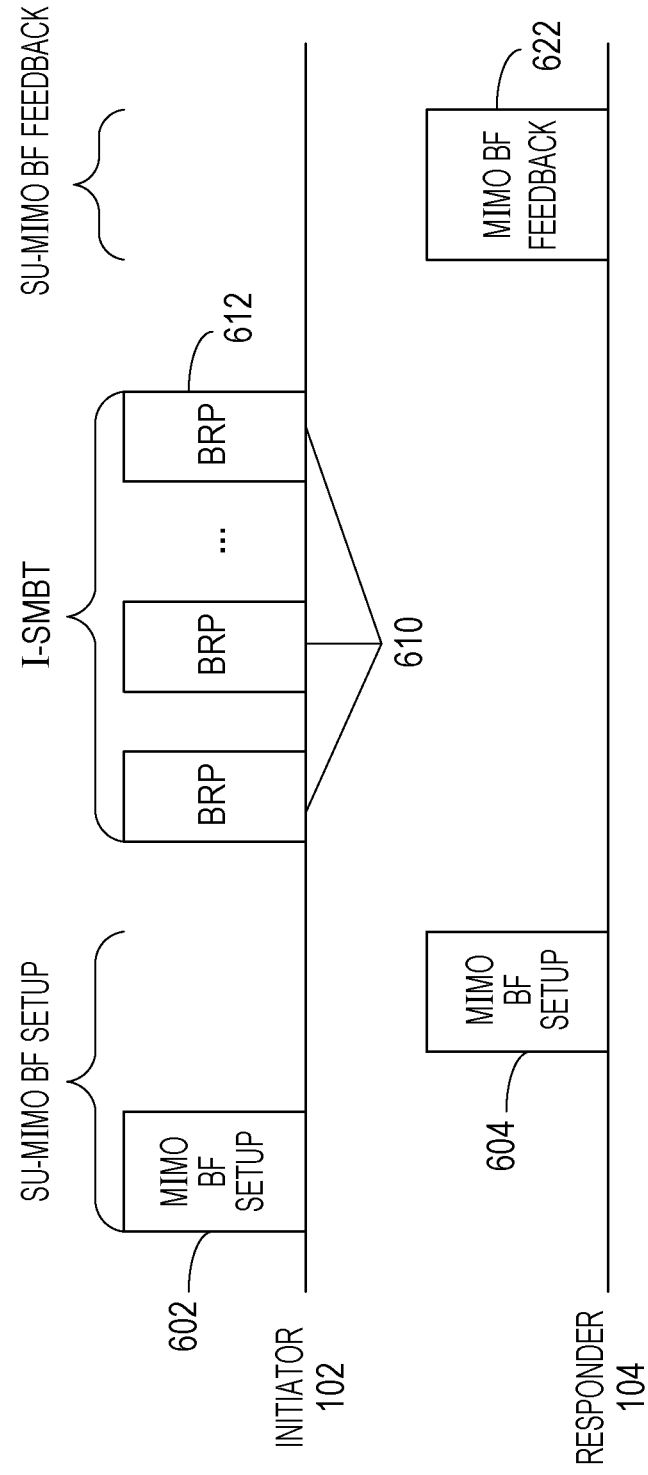

FIG. 18

| FIELD | SIZE (BITS) | MEANING |
|---|---|---|
| ELEMENT ID | 8 | |
| LENGTH | 8 | |
| ELEMENT ID EXTENSION | 8 | |
| SU/MU | 1 | SET TO 0 TO INDICATE SU-MIMO BF AND SET TO 1 TO INDICATE MU-MIMO BF. |
| NON-RECIPROCAL/RECIPROCAL MIMO PHASE | 1 | SET TO 0 TO INDICATE NON-RECIPROCAL MIMO PHASE AND SET TO 1 TO INDICATE RECIPROCAL MIMO PHASE. |
| EDMG GROUP ID | 8 | INDICATES EDMG GROUP ID OF TARGET MU GROUP. THIS FIELD IS RESERVED WHEN THE SU/MU FIELD IS SET TO 0. |
| GROUP USER MASK | 32 | |
| L-TX-RX | 8 | INDICATES THE REQUESTED NUMBER OF CONSECUTIVE TRN UNITS IN WHICH THE SAME AWV IS USED IN THE TRANSMISSION OF THE LAST M TRN SUBFIELDS OF EACH TRN UNIT. THIS FIELD IS RESERVED WHEN THE SU/MU FIELD IS SET TO 1. |
| REQUESTED EDMG TRN UNIT M | 4 | THE VALUE OF THIS FIELD PLUS ONE INDICATES THE REQUESTED NUMBER OF TRN SUBFIELDS IN A TRN UNIT TRANSMITTED WITH THE SAME AWV FOLLOWING A POSSIBLE AWV CHANGE. THIS FIELD IS RESERVED WHEN THE SU/MU FIELD IS SET TO 1. |
| INITIATOR | 1 | SET TO 1 TO INDICATE THAT THE TRANSMISSION SOURCE IS INITIATOR AND SET TO 0 OTHERWISE. THIS FIELD IS SET TO 1 WHEN THE SU/MU FIELD IS SET TO 1. |
| TRANSMISSION POWER | 5 | |
| MIMO FBCK-REQ | 10 | |
| RESERVED | 2 | |

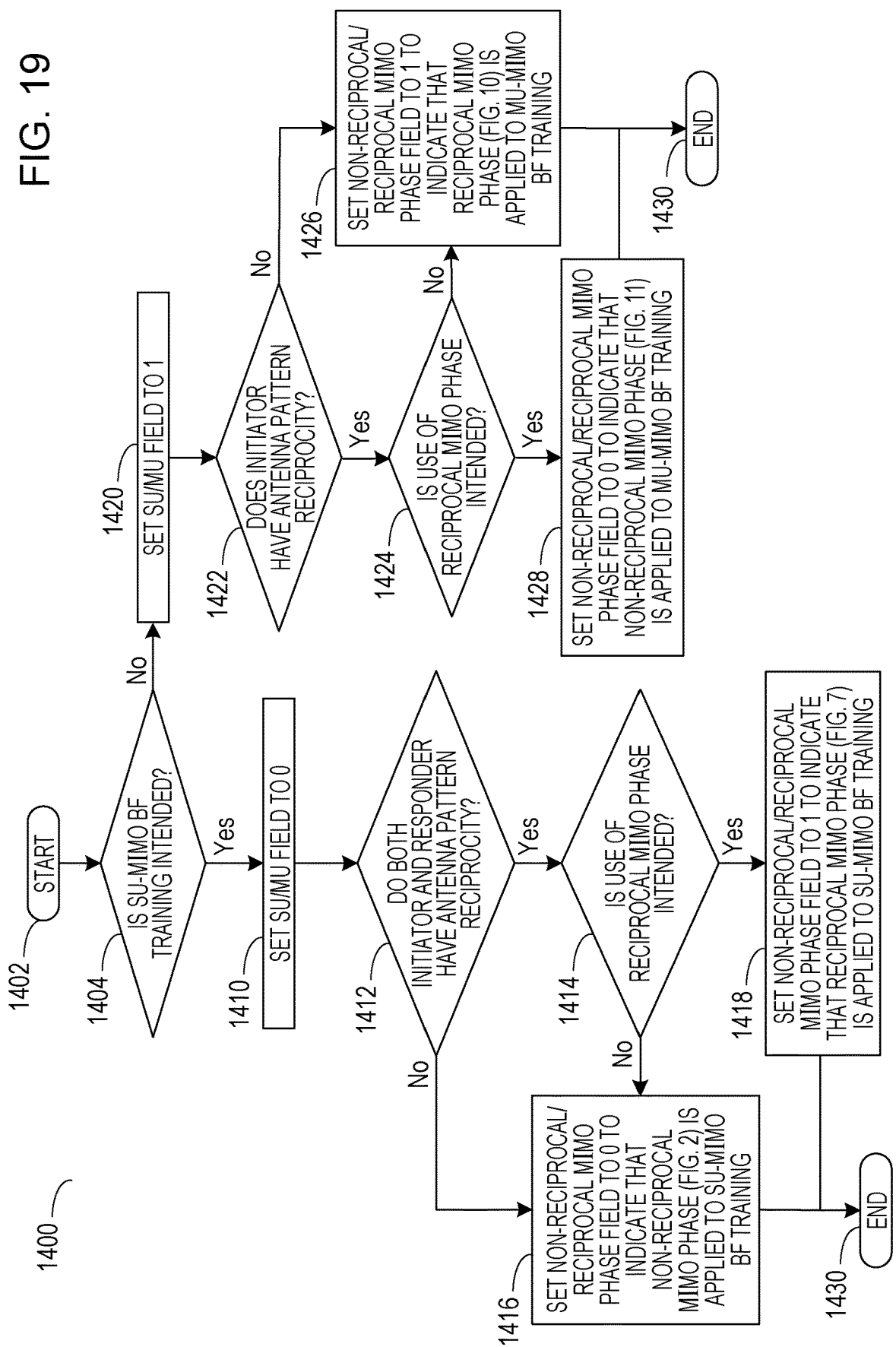

INITIATOR DEVICE, RESPONDER DEVICE, AND SYSTEM

TECHNICAL FIELD

The present disclosure relates to an initiator device, a responder device, and a system.

BACKGROUND ART

The unlicensed 60 GHz millimeter wave (mmW) network has been attracting a growing interest. The WirelessHD technology is the first 60 GHz mmW industry standard that enables multi-gigabit wireless streaming of high-definition audio, video, and data among home electronic appliances, personal computers, and mobile products. Another multi-gigabit wireless communication technology that operates via a 60 GHz mmW frequency band is the WiGig technology standardized as the IEEE 802.11ad standard by Institute of Electrical and Electronic Engineers (IEEE). With a broad channel bandwidth of 2.16 GHz, the WiGig technology realizes a physical layer (PHY) data transfer speed of up to 6.7 gigabits per second (Gbps). The IEEE 802.11 Working Group is developing an 802.11ay wireless interface as a next-generation WiGig technology capable of supporting a PHY data transfer speed higher than 100 Gbps. The single user (SU)-multiple input multiple output (MIMO) technique, in which plural spatial streams are simultaneously transmitted through plural spatial paths, is one of major techniques for 802.11ay.

802.11ay widely uses beamforming (BF) to achieve directional transmission, unlike other IEEE 802.11 technologies that operate via a 2.4 GHz or 5 GHz frequency band. In the 60 GHz mmW frequency band, a signal wavelength is smaller than a normal size of an object in a propagation environment, and thus beam-like propagation with discrete spatial signal paths spreads. A signal quality, for example, a signal-to-noise ratio (SNR), can be significantly improved in a case where both a transmit (TX) antenna beam and a receive (RX) antenna beam match a strong spatial signal path.

CITATION LIST

Non-Patent Literature

NPL 1
IEEE 802.11-17/1041r0, CR on SU-MIMO & MU-MIMO BF training and feedback, July 2017
NPL 2
IEEE 802.11-16/1620r2, 3.1.4 MIMO Channel Access, January 2017
NPL 3
IEEE 802.11-17/1184r2, MU-MIMO BF Selection, August 2017
NPL 4
IEEE Std 802.11TM-2016, Section 10.38 beamforming, December 2016

SUMMARY OF INVENTION

Technical Problem

Studies are in progress to execute efficient BF training for an SU-MIMO operation.

Solution to Problem

An initiator device according to one aspect of the present disclosure is a device that supports a single user (SU)-multiple input multiple output (MIMO) operation, including: a generation circuit that generates a first signal including a value indicating which of a reciprocal MIMO phase and a non-reciprocal MIMO phase is applied to SU-MIMO beamforming (BF) training; and a transmission circuit that transmits the first signal to a responder device.

A responder device according to one aspect of the present disclosure is a device that supports a single user (SU)-multiple input multiple output (MIMO) operation, including: a reception circuit that receives from an initiator device a first signal including a value indicating which of a reciprocal MIMO phase and a non-reciprocal MIMO phase is applied to SU-MIMO beamforming (BF) training; and a processing circuit that determines, on the basis of the value, which of the reciprocal MIMO phase and the non-reciprocal MIMO phase is applied to the SU-MIMO BF training.

A system according to one aspect of the present disclosure includes: an initiator device and a responder device that support a single user (SU)-multiple input multiple output (MIMO) operation, in which the initiator device includes a generation circuit that generates a first signal including a value indicating which of a reciprocal MIMO phase and a non-reciprocal MIMO phase is applied to SU-MIMO beamforming (BF) training, and a transmission circuit that transmits the first signal to the responder device, and in which the responder device includes a reception circuit that receives the first signal from the initiator device, and a processing circuit that determines, on the basis of the value, which of the reciprocal MIMO phase and the non-reciprocal MIMO phase is applied to the SU-MIMO BF training.

Note that, these comprehensive or specific aspects may be realized by a system, an apparatus, a method, an integrated circuit, a computer program, or a recording medium, and/or may be realized by an optional combination of a system, an apparatus, a method, an integrated circuit, a computer program, and a recording medium.

Advantageous Effects of Invention

According to one aspect of the present disclosure, it is possible to realize efficient BF training for an SU-MIMO operation.

Additional benefits and advantages of one aspect of the present disclosure will become apparent from the specification and drawings. The benefits and/or advantages may be individually obtained by some embodiments and features described in the specification and drawings, which need not all be provided in order to obtain one or more of such features.

BRIEF DESCRIPTION OF DRAWINGS

FIG. 4 is a diagram illustrating an example of a format of an action field of a MIMO BF setup frame according to Embodiment 1;
FIG. 5 is a diagram illustrating an example of a format of a MIMO setup control element according to Embodiment 1;

FIG. 7 is a diagram illustrating a reciprocal MIMO phase of SU-MIMO BF training according to Embodiment 1;

FIG. 18 is a diagram illustrating an example of a format of a MIMO setup control element according to Embodiment 2;

FIG. 19 is a flowchart for setting information fields of a MIMO setup control element according to Embodiment 2.

DESCRIPTION OF EMBODIMENTS

Hereinafter, embodiments of the present disclosure will be described in detail with reference to the drawings.

The technique described in the present disclosure can be applied to many wireless communication systems. For the purpose of exemplification, the following description in the present disclosure will be given about an IEEE 802.11-based wireless local area network (WLAN) system and the related terminologies thereof. This should not be understood as limitation of the present disclosure about alternative wireless communication systems.

Figure 1:
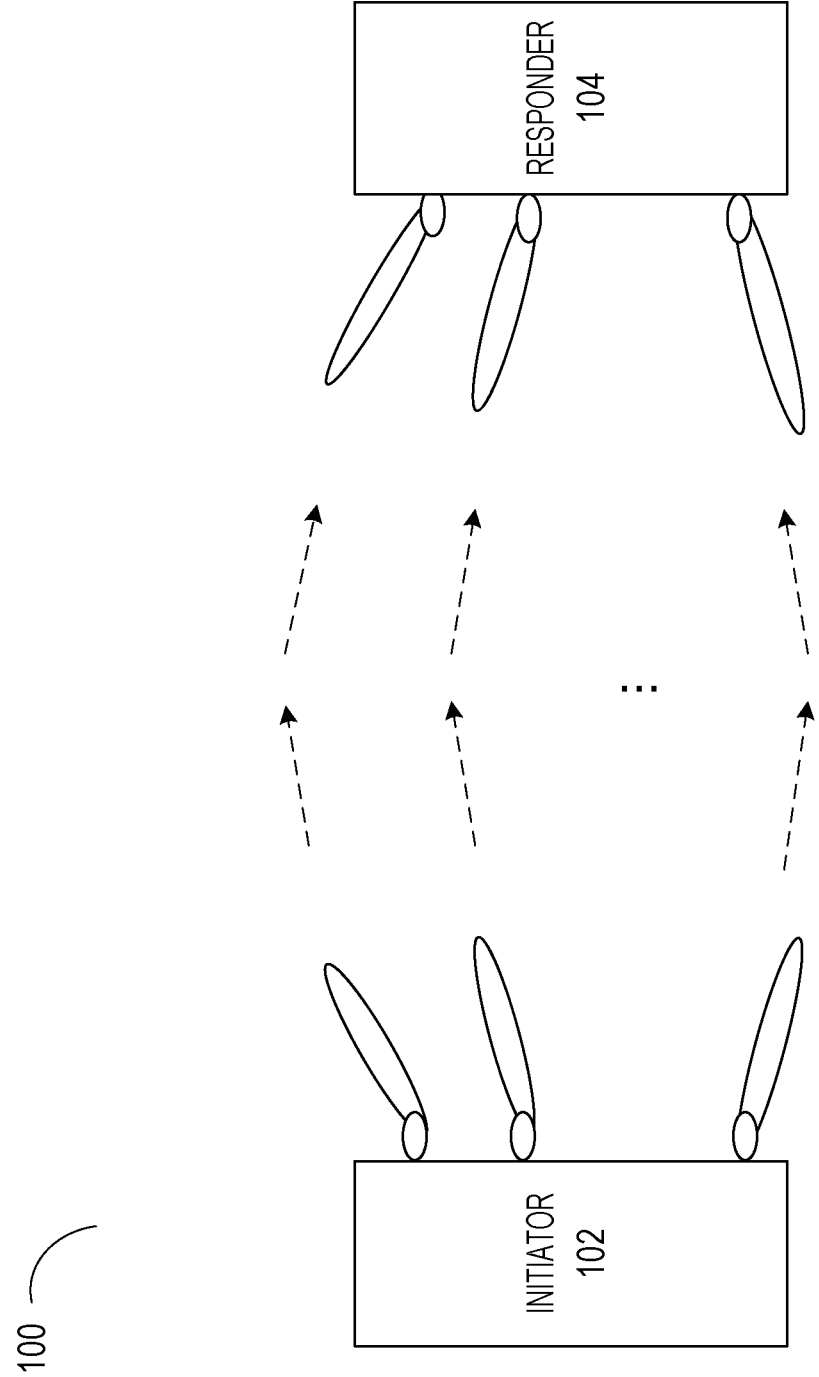
FIG. 1 is a diagram illustrating an SU-MIMO operation in a wireless system.

FIG. 1 illustrates an SU-MIMO operation in wireless system 100 (a system). Wireless system 100 includes initiator 102 and responder 104. Initiator 102 and responder 104 each include plural array antennas. The plural array antennas support a single user (SU)-multiple input multiple output (MIMO) operation using plural spatial streams configured to form one antenna beam/sector for each array antenna. A sector is one of configurations for directional control and is referred to by using a sector ID defined in the 802.11ay standard. Hereinafter, a sector may be read as an antenna weighting vector (AWV). An AWV may be used in the case of performing signaling (feedback) in which the correspondence with a sector ID is not fixed, for example, like an AWV used in the third TRN subfield of a BRP frame, which will be described below.

<SU-MIMO BF Training>

Before executing an SU-MIMO operation, analog beamforming training (SU-MIMO BF training) is applied to the plural array antennas of initiator 102 and responder 104 to determine recommended TX/RX sector combinations (for example, best TX/RX sector combinations) for transmitting plural spatial streams. Here, in a case where TX/RX represents transmission by initiator 102 and reception by responder 104, TX/RX sector combinations mean a TX sector combination of initiator 102 and a (best) RX sector combination of responder 104 for an initiator link in which initiator 102 performs transmission and responder 104 performs reception. In a case where TX/RX represents transmission by responder 104 and reception by initiator 102, TX/RX sector combinations mean a TX sector combination of responder 104 and a (best) RX sector combination of initiator 102 for a responder link in which responder 104 performs transmission and initiator 102 performs reception.

TX antennas and RX antennas are capable of forming, in each array antenna, one TX sector and one RX sector, respectively. Thus, recommended TX/RX sector combinations for MIMO transmission each belong to a specific TX/RX antenna pair. Furthermore, in a case where the number of TX antennas is equal to the number of RX antennas, all TX/RX antenna pairs to which the recommended TX/RX sector combinations belong do not overlap in the meaning that any TX antenna or any RX antenna belongs only to a single TX/RX antenna pair. This is because, in a case where there is an overlap among the TX/RX antenna pairs, a certain TX antenna or RX antenna is not involved in an SU-MIMO operation. In this case, the maximum number of spatial streams that is equal to the minimum number of TX antennas and RX antennas cannot be supported.

For example, in the TX/RX antenna pairs (TX1-RX2, TX2-RX1) in Table 1 given below, TX antennas TX1 and TX2 belong to one TX/RX antenna pair TX1-RX2 and one TX/RX antenna pair TX2-RX1, respectively. Also, RX antennas RX1 and RX2 belong to one TX/RX antenna pair TX2-RX1 and one TX/RX antenna pair TX1-RX2, respectively. In this case, the number of two MIMO streams, equal to the maximum number of spatial streams, that is, the minimum number of TX antennas and RX antennas, is supported.

TABLE 1

<Table 1> TX/RX antenna pairs and the number of MIMO streams supported

| TX/RX antenna pairs | Number of MIMO streams supported |
|---|---|
| (TX1-RX2, TX2-RX1) | 2 |
| (TX1-RX1, TX1-RX2) | 1 |
| (TX1-RX1, TX2-RX1) | 1 |

In contrast to this, in the TX/RX antenna pairs (TX1-RX1, TX1-RX2) in Table 1, TX antenna TX1 belongs to both two TX/RX antenna pairs TX1-RX1 and TX1-RX2. Thus, the two TX/RX antenna pairs TX1-RX1 and TX1-RX2 overlap, and the other TX antenna TX2 is not involved in an SU-MIMO operation. In this case, the number of one MIMO stream, smaller than two equal to the maximum number of spatial streams, that is, the minimum number of TX antennas and RX antennas, is supported.

As a result of the SU-MIMO BF training, TX antenna settings and corresponding RX antenna settings can be determined for simultaneous transmission of plural spatial streams from initiator 102 to responder 104 or from responder 104 to initiator 102. In addition, the SU-MIMO BF training makes it possible to perform a transmission BF operation and a reception BF operation between initiator 102 and responder 104. A single spatial stream is transmitted between initiator 102 and responder 104 via plural antennas that use the determined TX antenna settings. Also, a single spatial stream is received via plural antennas that use the determined corresponding RX antenna settings.

The SU-MIMO BF training is formed of two consecutive phases, a single input single output (SISO) phase and a MIMO phase. The SISO phase aims at collecting, by initiator 102, feedback from responder 104 on initiator transmit sector sweep executed last during or before the SISO phase, and collecting, by responder 104, feedback from initiator 102 on the last responder transmit sector sweep. The MIMO phase aims at training TX/RX sectors and TX/RX antennas to determine recommended TX/RX sector combinations and TX/RX antenna combinations for an SU-MIMO operation.

<SU-MIMO BF Training: Non-Reciprocal MIMO Phase>

Figure 2:
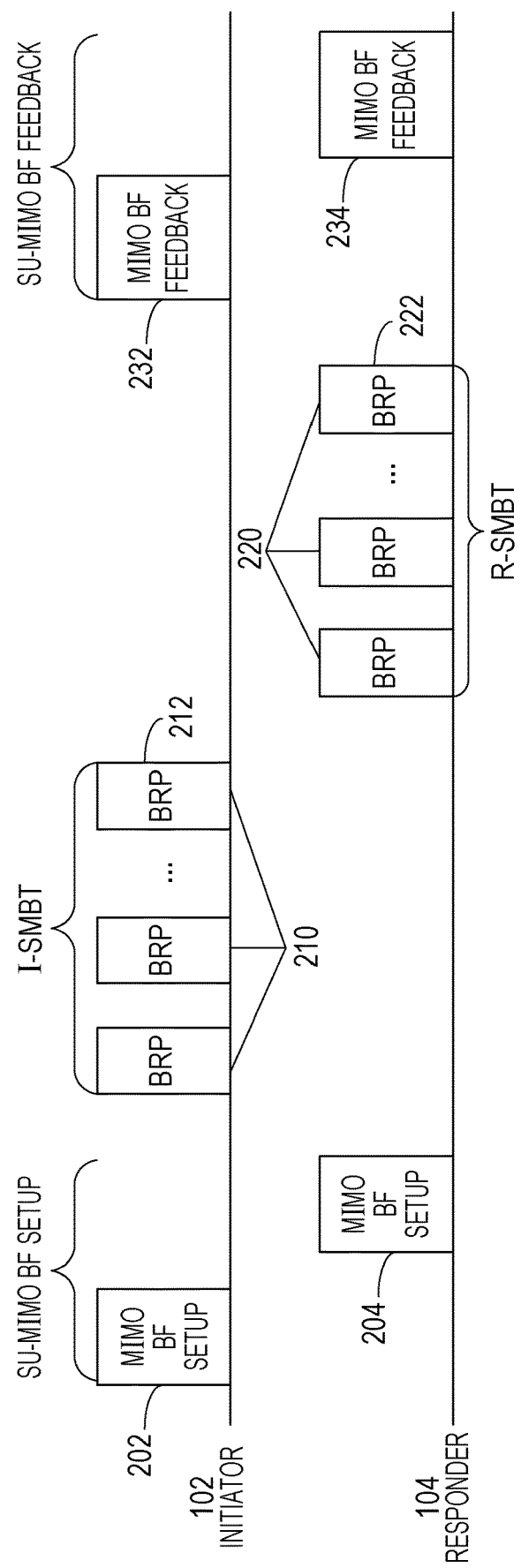
FIG. 2 is a diagram illustrating a non-reciprocal MIMO phase of SU-MIMO BF training.

FIG. 2 illustrates a non-reciprocal MIMO phase of SU-MIMO BF training. A MIMO phase (non-reciprocal MIMO phase) of 802.11ay SU-MIMO BF training is formed of four subphases, an SU-MIMO BF setup subphase, an initiator SU-MIMO BF training (I-SMBT) subphase, a responder SMBT (R-SMBT) subphase, and an SU-MIMO BF feedback subphase.

In the SU-MIMO BF setup subphase, initiator 102 first transmits MIMO BF setup frame 202 to responder 104. Hereinafter, a frame is an example of a signal. MIMO BF setup frame 202 includes setting information to be used by responder 104 in the R-SMBT subphase.

MIMO BF setup frame 202 indicates the number $N_{tsc(I)}$ of TX sector combinations requested for an initiator link and the number of TRN subfields requested for RX AWV training in the subsequent R-SMBT subphase. In addition, on the basis of the SNRs of TX sectors collected from responder 104 in the SISO phase, initiator 102 is capable of selecting a subset of candidate TX sectors for each antenna to reduce the time required for training of I-SMBT.

Note that, in a case where initiator 102 has antenna pattern reciprocity, the subset of candidate TX sectors for each antenna selected by initiator 102 for the I-SMBT subphase can be used to reduce the number of TRN subfields to be used for RX AWV training in the subsequent R-SMBT subphase.

Subsequently, after receiving MIMO BF setup frame 202 from initiator 102, responder 104 transmits MIMO BF setup frame 204 to initiator 102. MIMO BF setup frame 204 includes setting information to be used by initiator 102 in the I-SMBT subphase.

MIMO BF setup frame 204 indicates the number $N_{tsc(R)}$ of TX sector combinations requested for a responder link and the number of TRN subfields requested for RX AWV training in the subsequent I-SMBT subphase. In addition, on the basis of the SNRs of TX sectors collected from initiator 102 in the SISO phase, responder 104 is capable of selecting a subset of candidate TX sectors for each antenna to reduce the time required for training of R-SMBT.

Note that, in a case where responder 104 has antenna pattern reciprocity, the subset of candidate TX sectors for each antenna selected by responder 104 for the R-SMBT subphase can be used to reduce the number of TRN subfields required for RX AWV training in the subsequent I-SMBT subphase.

After receiving MIMO BF setup frame 204 from responder 104, initiator 102 starts the initiator SMBT (I-SMBT) subphase. In the I-SMBT subphase, initiator 102 performs initiator SU-MIMO BF training. Initiator 102 transmits EDMG BRP-RX/TX packets 210 to responder 104 via plural TX antennas.

EDMG BRP-RX/TX packets 210 each include plural TRN subfields transmitted for responder 104 to perform training of receive sectors and AWVs. Responder 104 receives EDMG BRP-RX/TX packets 210 while switching the receive sectors and receive AWVs, thereby being capable of performing training of the receive sectors and AWVs. Initiator 102 transmits EDMG BRP-RX/TX packets 210 while switching transmit sectors, thereby being capable of performing training of the transmit sectors. That is, EDMG BRP-RX/TX packets 210 are packets for evaluating (training) combinations of TX sectors of the initiator and RX sectors and AWVs of the responder. The number of TRN subfields of each EDMG BRP-RX/TX packet 210 is configured in accordance with TRN configuration information in MIMO BF setup frame 204 received from responder 104.

Responder 104 receives EDMG BRP-RX/TX packets 210 via plural RX antennas and trains different TX/RX sector combinations for the initiator link.

Subsequently, after receiving last EDMG BRP-RX/TX packet 212 from initiator 102, responder 104 starts the responder SMBT (R-SMBT) subphase. In the R-SMBT subphase, responder 104 transmits EDMG BRP-RX/TX packets 220 to initiator 102 via plural TX antennas.

EDMG BRP-RX/TX packets 220 are packets similar to EDMG BRP-RX/TX packets 210 described above except that initiator 102 and responder 104 are replaced with responder 104 and initiator 102, respectively. The number of TRN subfields of each EDMG BRP-RX/TX packet 220 is configured in accordance with TRN configuration information in MIMO BF setup frame 202 received from initiator 102 in the SU-MIMO BF setup subphase.

Initiator 102 receives EDMG BRP-RX/TX packets 220 via plural RX antennas and trains different TX/RX sector combinations for the responder link.

Subsequently, after receiving last EDMG BRP-RX/TX packet 222 from responder 104, initiator 102 starts the SU-MIMO BF feedback subphase. In the SU-MIMO BF feedback subphase, initiator 102 transmits MIMO BF feedback frame 232 to responder 104.

MIMO BF feedback frame 232 indicates $N_{tsc(R)}$ recommended (for example, best) TX sector combinations for the responder link that are determined on the basis of channel measurement data acquired from the R-SMBT subphase. Here, the responder link is a link from responder 104 to initiator 102. MIMO BF feedback frame 232 includes the SNRs corresponding to the $N_{tsc(R)}$ recommended TX sector combinations. MIMO BF feedback frame 232 is capable of including channel measurement results corresponding to the $N_{tsc(R)}$ recommended TX sector combinations.

Subsequently, after receiving MIMO BF feedback frame 232 from initiator 102, responder 104 transmits MIMO BF feedback frame 234 to initiator 102.

MIMO BF feedback frame 234 indicates $N_{tsc(I)}$ recommended (for example, best) TX sector combinations for the initiator link that are determined on the basis of channel measurement data acquired from the I-SMBT subphase. Here, the initiator link is a link from initiator 102 to responder 104. MIMO BF feedback frame 234 includes the SNRs corresponding to the $N_{tsc(I)}$ recommended TX sector combinations. MIMO BF feedback frame 234 includes channel measurement results corresponding to the $N_{tsc(I)}$ recommended TX sector combinations.

According to the present disclosure, in the non-reciprocal MIMO phase of SU-MIMO BF training illustrated in FIG. 2, $N_{tsc(I)}$ recommended TX sector combinations (or equivalent $N_{tsc(I)}$ recommended TX-RX AWV configurations) for the initiator link and $N_{tsc(R)}$ recommended TX sector combinations (or equivalent $N_{tsc(R)}$ recommended TX-RX AWV configurations) for the responder link are determined by using a method in which TX or RX AWVs are not derived from the same antenna.

Initiator 102 and responder 104 need to train all combinations of TX/RX sectors, and the execution of SU-MIMO BF training requires a long time. The present disclosure has been conceived to reduce the time required for SU-MIMO BF training.

Embodiment 1

<Configuration of STA>

Figure 3A:
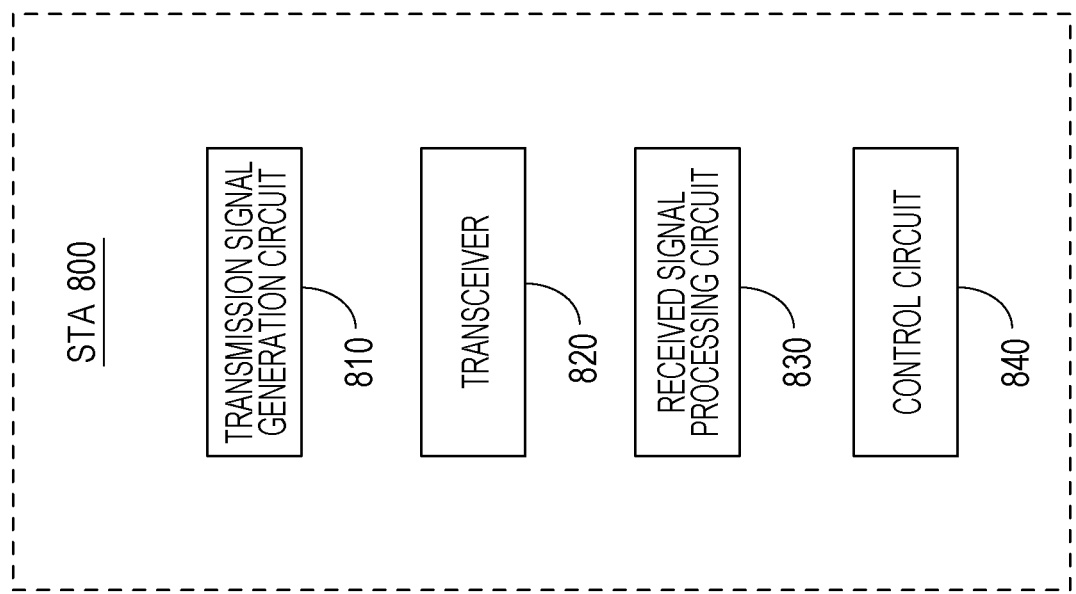
FIG. 3A is a schematic configuration diagram of a station (STA) according to the present disclosure.
Figure 3B:
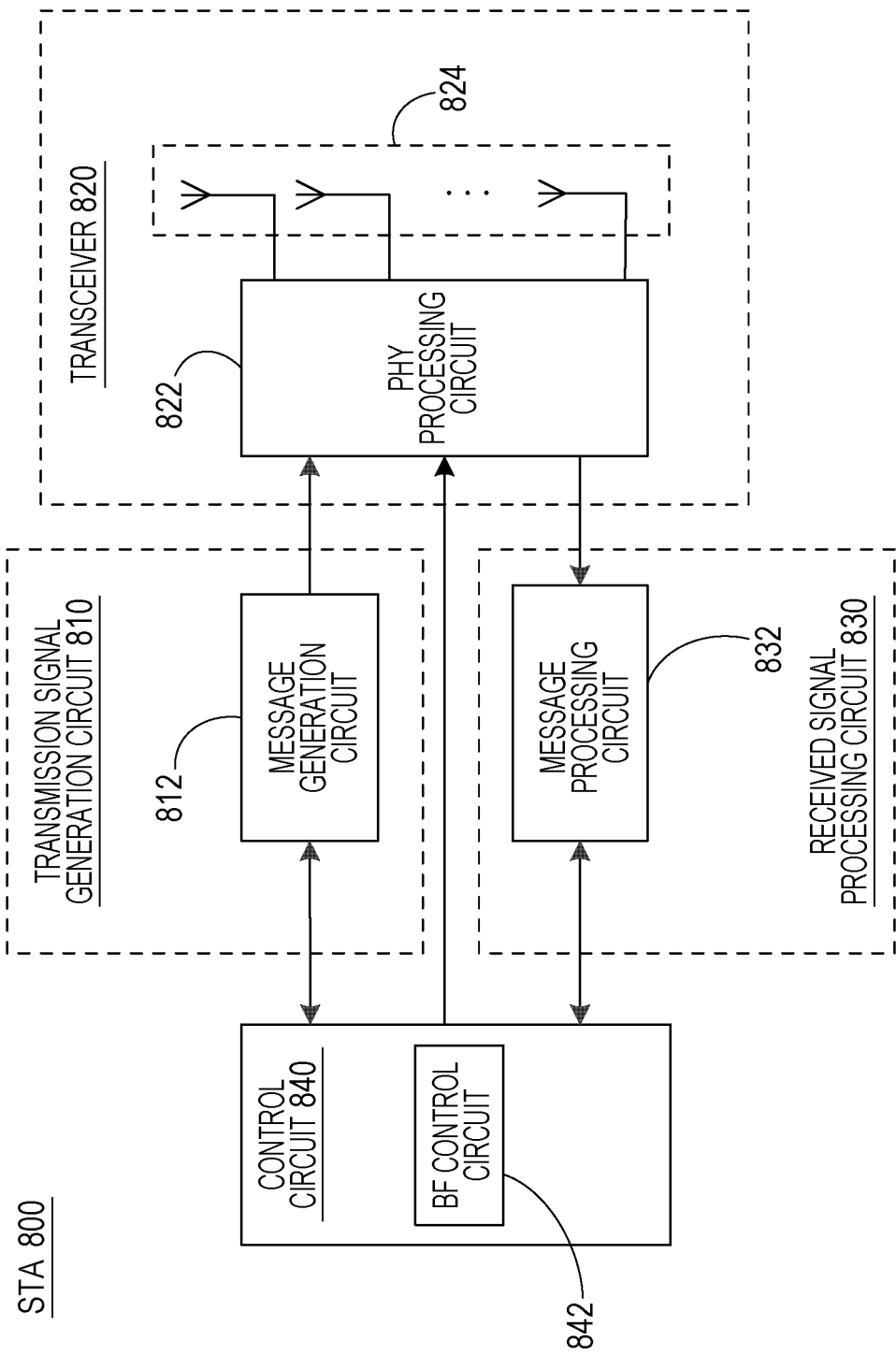
FIG. 3B is a detailed configuration diagram of the STA according to the present disclosure.

FIG. 3A is a schematic configuration diagram of STA 800 according to the present disclosure. FIG. 3B is a detailed configuration diagram of STA 800 according to the present disclosure. STA 800 is an example of initiator 102 or responder 104 according to the present disclosure. STA 800 includes transmission signal generation circuit 810 (a generation circuit), transceiver 820 (a transmission circuit and/or a reception circuit), received signal processing circuit 830 (a processing circuit), and control circuit 840. For example, transmission signal generation circuit 810, received signal processing circuit 830, and control circuit 840 may be packaged as a MAC processing circuit.

Transmission signal generation circuit 810 generates a transmission signal. Transmission signal generation circuit 810 includes message generation circuit 812. Message generation circuit 812 generates a signal under control by control circuit 840. The signal is a data signal or a control signal and is, for example, a packet or a frame. The data signal and control signal that are generated are, for example, a MIMO BF setup frame, a BRP frame, and a MIMO BF feedback frame.

Transceiver 820 transmits a generated signal. In addition, transceiver 820 receives a radio signal. Transceiver 820 includes PHY processing circuit 822 and plural antennas 824. PHY processing circuit 822 performs PHY processing on a signal generated by message generation circuit 812. The signal that has been subjected to PHY processing is converted from a baseband signal into a radio frequency signal and is transmitted via plural antennas 824.

Received signal processing circuit 830 processes a received signal. Received signal processing circuit 830 includes message processing circuit 832. Message processing circuit 832 processes (analyzes) a received signal under control by control circuit 840 and provides the signal to control circuit 840. The received signal is a data signal or a control signal and is, for example, a packet or a frame.

Control circuit 840 is a PHY and media access control (MAC) protocol controller and controls an entire PHY and MAC protocol operation. Control circuit 840 includes BF control circuit 842 that controls analog BF and hybrid BF operations according to the present disclosure (for example, SU-MIMO BF training and the subsequent digital BF procedure). BF control circuit 842 determines TX sectors and RX sectors (recommended TX sectors and RX sectors) to be used for MIMO transmission by STA 800.

<Format>

FIG. 4 illustrates an example of a format of an action field of a MIMO BF setup frame according to Embodiment 1. As illustrated in FIG. 4, the MIMO BF setup frame includes, as a part of the action field, a MIMO setup control element as the fourth piece of information.

FIG. 5 illustrates an example of a format of MIMO setup control element 400 according to Embodiment 1. MIMO setup control element 400 is used to convey configuration information about SU-MIMO BF training and feedback subphases or MU-MIMO BF training and feedback subphases.

MIMO setup control element 400 includes an SU/MU field, a non-reciprocal/reciprocal SU-MIMO phase field, a DL/UL MU-MIMO phase field, and a link type field.

The SU/MU field indicates that, for example, when the value is 1, SU-MIMO BF training is intended. The SU/MU field indicates that, for example, when the value is 0, multi-user MIMO (MU-MIMO) BF training is intended.

The non-reciprocal/reciprocal SU-MIMO phase field indicates that, for example, when the value is 1, the non-reciprocal MIMO phase illustrated in FIG. 2 is applied to SU-MIMO BF training. The non-reciprocal/reciprocal SU-MIMO phase field indicates that, for example, when the value is 0, the reciprocal MIMO phase illustrated in FIG. 7 is applied to SU-MIMO BF training. When the value of the SU/MU field is 0, the non-reciprocal/reciprocal SU-MIMO phase field is a reserved field.

The DL/UL MU-MIMO phase field indicates whether a downlink MIMO phase (see FIG. 10) or an uplink MIMO phase (see FIG. 11) is applied to MU-MIMO BF training. This field is reserved for SU-MIMO BF training.

The link type field indicates whether the configuration information is information about the initiator link or information about the responder link.

In Embodiment 1, in a case where the non-reciprocal MIMO phase is applied to SU-MIMO BF training, a value indicating that the non-reciprocal MIMO phase is applied is set to MIMO BF setup frame 202 illustrated in FIG. 2. For example, the value of the SU/MU field and the value of the non-reciprocal/reciprocal SU-MIMO phase field of the MIMO setup control element in MIMO BF setup frame 202 illustrated in FIG. 2 are set to 1 in the case of indicating that the nonreciprocal MIMO phase is applied to SU-MIMO BF training.

Furthermore, the value of the link type field is set to 1 in a case where the configuration information included in MIMO BF setup frame 202 is information about the initiator link. Furthermore, the SU/MU field and the non-reciprocal/reciprocal SU-MIMO phase field of MIMO BF setup frame 204 are set in the same manner as the corresponding fields of MIMO BF setup frame 202.

In other words, in a case where the non-reciprocal MIMO phase is applied to SU-MIMO BF training, both the value of the SU/MU field and the value of the non-reciprocal/reciprocal SU-MIMO phase field of the MIMO setup control element in MIMO BF setup frame 204 are set to 1.

Furthermore, in a case where the configuration information included in MIMO BF setup frame 204 is information about the responder link, the value of the link type field is set to 0.

In Embodiment 1, the value set to the MIMO BF setup frame in a case where the reciprocal MIMO phase is applied to SU-MIMO BF training will be described below with reference to FIG. 7.

Figure 6:
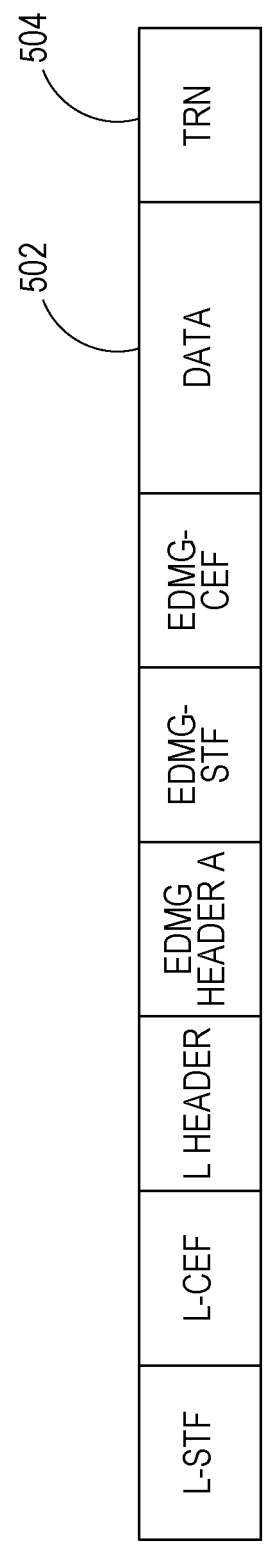
FIG. 6 is a diagram illustrating an example of a format of an enhanced directional multi-gigabit (EDMG) beam refinement protocol (BRP) packet according to Embodiment 1.

FIG. 6 illustrates an example of a format of an EDMG BRP packet according to Embodiment 1. A packet is an example of a signal. The EDMG BRP packet includes data field 502 and TRN field 504. Data field 502 includes a BRP frame. TRN field 504 includes plural TRN subfields and is configured in accordance with the type of the EDMG BRP packet. For example, TRN field 504 of an EDMG BRP-TX packet is configured to train one or plural TX sectors, whereas TRN field 504 of an EDMG BRP-RX/TX packet is configured to train one or plural TX sectors and some RX AWVs of each TX sector.

<SU-MIMO BF Training: Reciprocal MIMO Phase>

A case is considered in which both initiator 102 and responder 104 have antenna pattern reciprocity. Here, antenna pattern reciprocity is a property in which the characteristics of TX antennas and RX antennas used for MIMO transmission match in each direction and the best TX sector and the best RX sector match. In this case, initiator 102 may start a reciprocal MIMO phase for SU-MIMO BF training.

FIG. 7 illustrates a reciprocal MIMO phase of SU-MIMO BF training according to Embodiment 1. The reciprocal MIMO phase illustrated in FIG. 7 includes three subphases, an SU-MIMO BF setup subphase, an I-SMBT subphase, and an SU-MIMO BF feedback subphase. In the reciprocal MIMO phase, it is possible to omit the packets corresponding to EDMG BRP-RX/TX packets 220 of R-SMBT for the responder link and the frame corresponding to MIMO BF feedback 232 for R-SMBT among the frames and packets illustrated in FIG. 2 transmitted and received in the non-reciprocal MIMO phase.

In the SU-MIMO BF setup subphase, initiator 102 transmits MIMO BF setup frame 602 to responder 104. In Embodiment 1, the values of the SU/MU field and the non-reciprocal/reciprocal SU-MIMO phase field of the MIMO setup control element in MIMO BF setup frame 602 are set to 1 and 0, respectively, to indicate that the reciprocal MIMO phase is applied to SU-MIMO BF training. The value of the link type field is set to 1 in a case where the configuration information included in MIMO BF setup frame 602 is information about the initiator link. MIMO BF setup frame 602 indicates the number $N_{tsc(I)}$ of TX sector combinations requested for the initiator link. In addition, on the basis of the SNRs of TX sectors collected from responder 104 in the SISO phase, initiator 102 is capable of selecting (setting) a subset of candidate TX sectors for each antenna with a decreased number of TRN subfields to reduce the time required for training of I-SMBT.

After receiving MIMO BF setup frame 602 from initiator 102, responder 104 transmits MIMO BF setup frame 604 to initiator 102.

The values of the SU/MU field and the non-reciprocal/reciprocal SU-MIMO phase field of MIMO BF setup frame 604 are set to the same values as the values of the corresponding fields of MIMO BF setup frame 602. In other words, the values of the SU/MU field and the non-reciprocal/reciprocal SU-MIMO phase field of MIMO BF setup frame 604 are set to 1 and 0, respectively, to indicate that the reciprocal MIMO phase is applied to SU-MIMO BF training. The value of the link type field is set to 1 in a case where the configuration information included in MIMO BF setup frame 604 is information about the initiator link.

Furthermore, MIMO BF setup frame 604 indicates the number of training (TRN) subfields requested for RX AWV training in the subsequent I-SMBT subphase. On the basis of the SNRs of TX sectors collected from initiator 102 in the SISO phase, responder 104 is capable of selecting a subset of candidate RX sectors for each antenna with a decreased number of TRN subfields to reduce the time required for training of I-SMBT.

After receiving MIMO BF setup frame 604 from responder 104, initiator 102 starts the I-SMBT subphase. In the I-SMBT subphase, initiator 102 transmits EDMG BRP-RX/TX packets 610 (a first BRP packet) to responder 104. The number of TRN subfields of each EDMG BRP-RX/TX packet 610 is configured in accordance with TRN configuration information in MIMO BF setup frame 604 received from responder 104 in the SU-MIMO BF setup subphase.

After receiving last EDMG BRP-RX/TX packet 612 from initiator 102, responder 104 starts the SU-MIMO BF feedback subphase. Responder 104 transmits MIMO BF feedback frame 622 (a first MIMO BF feedback frame) to initiator 102. MIMO BF feedback frame 622 indicates $N_{tsc(I)}$ recommended (for example, best) TX sector combinations for the initiator link that are determined on the basis of channel measurement data acquired from the I-SMBT subphase. MIMO BF feedback frame 622 includes the SNRs corresponding to the $N_{tsc(I)}$ recommended TX sector combinations. MIMO BF feedback frame 622 may include channel measurement results corresponding to the $N_{tsc(I)}$ recommended TX sector combinations.

In Embodiment 1, in the reciprocal MIMO phase of SU-MIMO BF training illustrated in FIG. 7, $N_{tsc(I)}$ recommended TX sector combinations (or equivalent $N_{tsc(I)}$ recommended TX-RX AWV configurations) for the initiator link are determined by using a method in which TX or RX AWVs are not derived from the same antenna. The $N_{tsc(I)}$ recommended TX/RX sector combinations (for example, best TX/RX sector combinations) determined for the initiator link are handled as $N_{tsc(R)}$ recommended RX/TX sector combinations for the responder link. Note that $N_{tsc(I)} = N_{tsc(R)}$.

On the basis of the recommended RX/TX sector combinations for the responder link, initiator 102 determines a recommended RX sector combination to be used by initiator 102 for the responder link. The recommended RX sector combination to be used by initiator 102 for the responder link may be the same as the recommended TX sector combination to be used by initiator 102 for the initiator link.

On the basis of the recommended RX/TX sector combinations for the responder link, responder 104 determines a recommended TX sector combination to be used by responder 104 for the responder link. The recommended TX sector combination to be used by responder 104 for the responder link may be the same as the recommended RX sector combination to be used by responder 104 for the initiator link.

In Embodiment 1, the above-described reciprocal MIMO phase is used in addition to or instead of the above-described non-reciprocal MIMO phase, as a MIMO phase of SU-MIMO beamforming. Initiator 102 determines whether the non-reciprocal MIMO phase or the reciprocal MIMO phase is to be used in SU-MIMO BF training in responder 104. In a case where initiator 102 or responder 104 does not have antenna pattern reciprocity, in other words, in a case where the TX antenna pattern related to an AWV is not the same as the RX antenna pattern of the same AWV, the non-reciprocal MIMO phase is used. In a case where both initiator 102 and responder 104 have antenna pattern reciprocity, either the non-reciprocal MIMO phase or the reciprocal MIMO phase can be used.

<Hybrid BF>

In Embodiment 1, after SU-MIMO BF training including the MIMO phase illustrated in FIG. 2 or FIG. 7 has been completed, initiator 102 and responder 104 are capable of executing a digital BF procedure of a hybrid BF operation. The digital BF procedure enables a baseband beam former to be determined on the basis of the antenna configuration determined as a result of the SU-MIMO BF training.

Figure 8A:
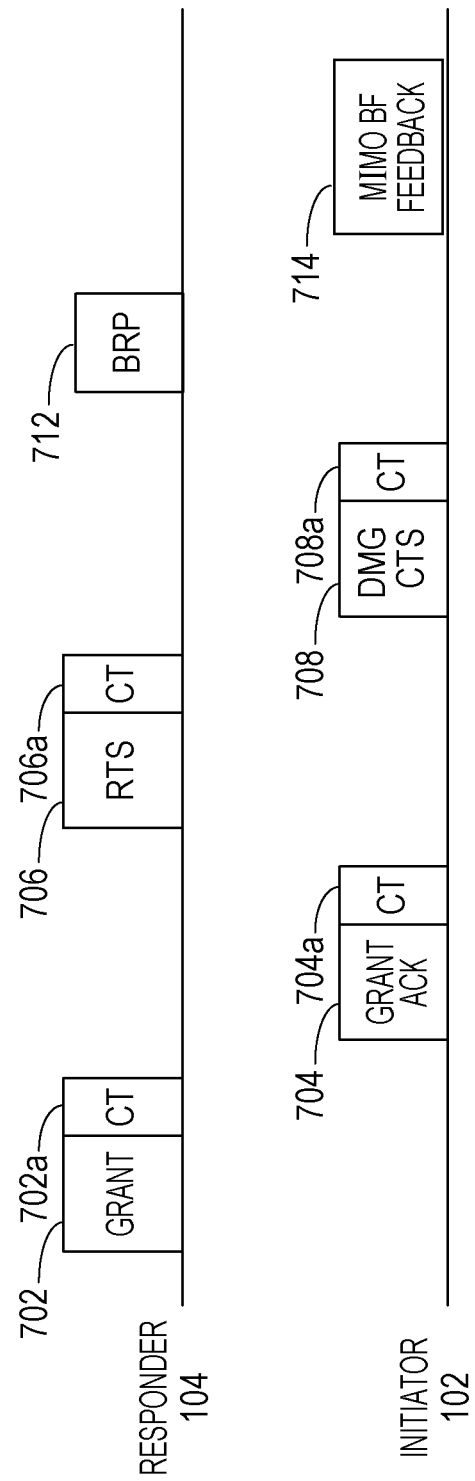
FIG. 8A is a diagram illustrating an example of a digital BF procedure according to Embodiment 1.

FIG. 8A illustrates an example of a digital BF procedure according to Embodiment 1. In the example of the digital BF procedure illustrated in FIG. 8A, digital BF is applied to the responder link.

First, responder 104 transmits control trailer (CT) 702a and grant frame 702 to initiator 102. Here, CT 702a includes information indicating the antenna configuration used for the responder link in the digital BF procedure.

Subsequently, after successfully receiving grant frame 702, initiator 102 transmits CT 704a and grant acknowledgement (grant ack) frame 704 to respond to responder 104. Here, CT 704a includes information indicating the antenna configuration used for the initiator link in the digital BF procedure.

Subsequently, responder 104 transmits CT 706a and ready to send (RTS) frame 706 to initiator 102 to access a channel, and makes a notification about the start of the digital BF procedure for the responder link. Here, CT 706a includes information indicating the antenna configuration used for the responder link in the digital BF procedure.

Subsequently, after successfully receiving RTS frame 706, initiator 102 transmits CT 708a and directional multi-gigabit (DMG) clear to send (CTS) frame 708 to respond to responder 104. Here, CT 708a includes information indicating the antenna configuration used for the initiator link in the digital BF procedure. Furthermore, initiator 102 configures array antennas for the responder link on the basis of the antenna configuration information in grant ack frame 704.

Subsequently, responder 104 transmits EDMG BRP-TX packet 712 (a second BRP packet), which will be described below with reference to FIG. 6, thereby sounding a channel for the initiator link (transmits a signal for channel measurement). EDMG BRP-TX packet 712 is transmitted with the antenna configuration for the responder link based on the result of the SU-MIMO BF training illustrated in FIG. 2 or FIG. 7.

Subsequently, initiator 102 transmits MIMO BF feedback frame 714 (a second MIMO BF feedback frame) including the SNR, MIMO channel measurement, or digital precoding matrix information for the responder link, to respond to responder 104.

As a result of the above-described procedure, initiator 102 obtains feedback of the SNR for the responder link by using hybrid BF, and determines an appropriate modulation and coding scheme (MC S) on the basis of the SNR.

Figure 8B:
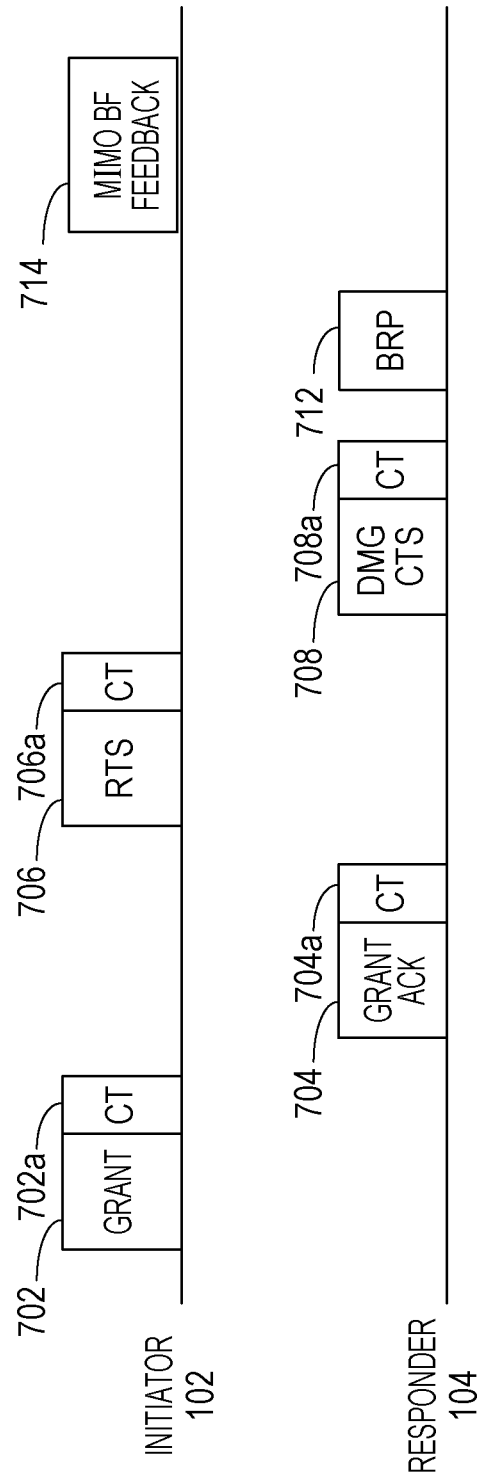
FIG. 8B is a diagram illustrating another example of the digital BF procedure according to Embodiment 1.

FIG. 8B illustrates another example the digital BF procedure according to Embodiment 1. In the example of the digital BF procedure illustrated in FIG. 8B, digital BF is applied to the initiator link.

First, initiator 102 transmits CT 702a and grant frame 702 to responder 104. Here, CT 702a includes information indicating the antenna configuration used for the initiator link in the digital BF procedure.

Subsequently, after successfully receiving grant frame 702, responder 104 transmits CT 704a and grant ack frame 704 to respond to initiator 102. Here, CT 704a includes information indicating the antenna configuration used for the responder link in the digital BF procedure.

Subsequently, initiator 102 transmits CT 706a and RTS frame 706 to responder 104 to access a channel, and makes a notification about the start of the digital BF procedure for the initiator link. Here, CT 706a includes information indicating the antenna configuration used for the initiator link in the digital BF procedure.

Subsequently, after successfully receiving RTS frame 706, responder 104 transmits CT 708a and DMG CTS frame 708 to respond to initiator 102. Here, CT 708a includes information indicating the antenna configuration used for the responder link in the digital BF procedure. Furthermore, responder 104 configures array antennas for the responder link on the basis of the antenna configuration information in grant ack frame 704.

Subsequently, responder 104 transmits EDMG BRP-TX packet 712 (the second BRP packet), which will be described below with reference to FIG. 6, thereby sounding a channel for the responder link (transmits a signal for channel measurement). EDMG BRP-TX packet 712 is transmitted with the antenna configuration for the responder link based on the result of the SU-MIMO BF training illustrated in FIG. 2 or FIG. 7.

Subsequently, initiator 102 transmits MIMO BF feedback frame 714 (the second MIMO BF feedback frame) including the SNR, MIMO channel measurement, or digital precoding matrix information for the responder link, to respond to responder 104.

In a case where measurement of the initiator link is performed by using BRP frames 610 in FIG. 7, BRP frame 712 is used to perform measurement of the responder link. Although measurement of the responder link is omitted in the SU-MIMO BF training illustrated in FIG. 7 and measurement of the initiator link is omitted in FIG. 8A or FIG. 8B, the SNRs of both the initiator link and the responder link can be measured.

As a result of the above-described procedure, responder 104 obtains feedback of the SNR for the responder link by using hybrid BF, and determines an appropriate modulation and coding scheme (MCS) on the basis of the SNR.

The non-reciprocal/reciprocal SU-MIMO phase field described above with reference to FIG. 5 may be included in CT 702a, 704a, 706a, or 708a described above with reference to FIG. 8A and FIG. 8B in addition to or instead of MIMO setup control element 400. In a case where responder 104 or initiator 102 designates reciprocal in CT 702a, initiator 102 or responder 104 omits transmission of a BRP frame. Thus, the execution time of the digital BF procedure illustrated in FIG. 8A or FIG. 8B can be shortened and the power consumption can be reduced.

In the digital BF procedure illustrated in FIG. 8B, responder 104 may transmit a DMG CTS to Self frame instead of DMG CTS 708. Here, the DMG CTS to Self frame is a frame for notifying another STA that responder 104 will perform transmission after the DMG CTS to Self frame by setting responder 104 as both the source and destination addresses. The operation of transmitting a DMG CTS to Self frame as a response to RTS frame 706 is not specified in an existing standard, such as the 11ad standard, but the frame exchange order conforms to the existing standard.

In a case where the value of the non-reciprocal/reciprocal SU-MIMO phase field included in CT 706a of RTS frame 706 indicates reciprocal, transmission of BRP 712 after transmission of DMG CTS 708 may be permitted, and the execution of DMG CTS to Self may be permitted after transmission of RTS 706. Initiator 102 notifies responder 104 by setting a value indicating reciprocal in the non-reciprocal/reciprocal SU-MIMO phase field, thereby being capable of assuming that responder 104 transmits frames in an order different from that according to the 11ad standard. Thus, responder 104 is capable of performing DMG CTS to Self that is not defined in the 11ad standard in response to RTS frame 706, without increasing the complexity of control. In addition, responder 104 is capable of transmitting BRP 712 without increasing the complexity of control after transmitting DMG CTS 708.

<Access to SU-MIMO Channel>

Figure 9:
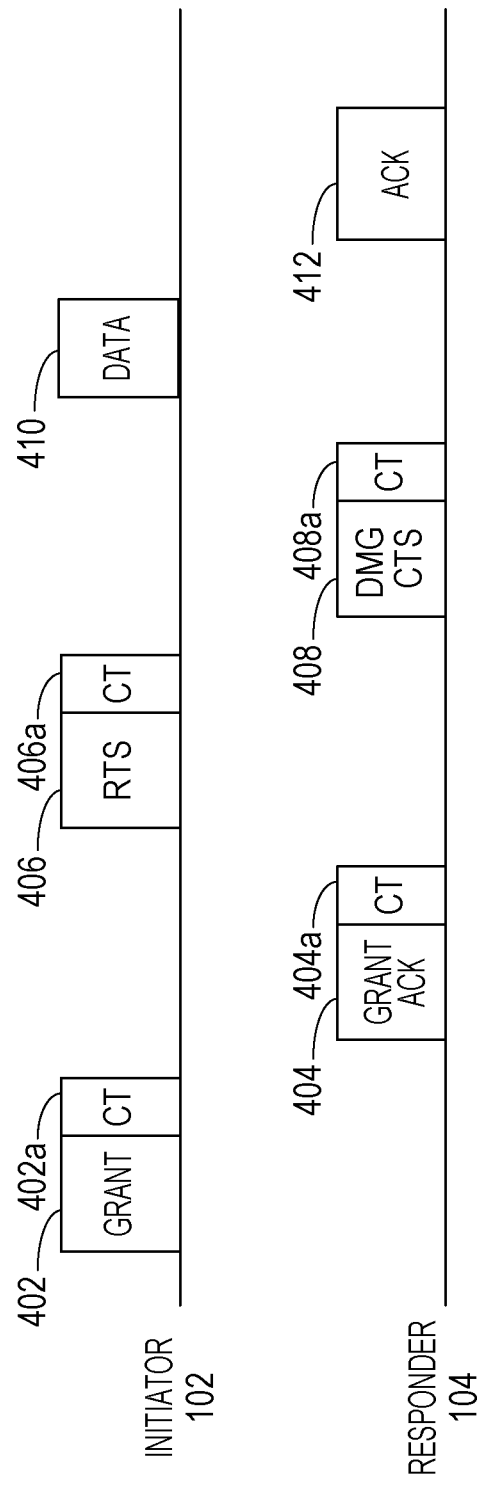
FIG. 9 is a diagram illustrating access to an SU-MIMO channel after SU-MIMO BF training according to Embodiment 1.

FIG. 9 illustrates access to an SU-MIMO channel after the SU-MIMO BF training according to Embodiment 1 (FIG. 7) or after the SU-MIMO BF training illustrated in FIG. 2. Initiator 102 and responder 104 perform the SU-MIMO BF training illustrated in FIG. 2 or FIG. 7 and then accesses the SU-MIMO channel by using a recommended TX sector combination determined through the training.

First, initiator 102 transmits CT 402a and grant frame 402 to responder 104. Here, CT 402a includes information indicating that SU-MIMO transmission is to be used and information indicating a recommended TX sector combination to be used in SU-MIMO data transmission or a digital BF procedure for the initiator link.

Subsequently, after successfully receiving grant frame 402, responder 104 transmits CT 404a and grant ack frame 404 to respond to initiator 102. Here, CT 404a includes information indicating that MIMO RX can be prepared by a target time, information indicating which of the initiator and the responder was the transmission source of CT 404a during the SU-MIMO BF training, and information indicating a recommended TX sector combination to be used in SU-MIMO data transmission or a digital BF procedure for the responder link. Note that, in the SU-MIMO BF training illustrated in FIG. 2 or FIG. 7 and the SU-MIMO channel access illustrated in FIG. 9, the initiator and the responder may change places.

Furthermore, CT 404a includes an SU-MIMO transmission configuration type field. Here, the SU-MIMO transmission configuration type field is a field indicating that a recommended TX sector combination can be obtained from the SU-MIMO BF training and feedback for the responder link or the initiator link. For example, in a case where the value of the SU-MIMO transmission configuration type field is 0, the SU-MIMO transmission configuration type field includes information indicating that a recommended TX sector combination can be obtained from the SU-MIMO BF training and feedback for the initiator link.

In a case where recommended TX/RX sector combinations determined for the initiator link are respectively handled as recommended RX/TX sector combinations for the responder link, initiator 102 may operate under the assumption that a recommended TX sector combination can be obtained from the SU-MIMO BF training and feedback for the initiator link without referring to the SU-MIMO transmission configuration type field.

For example, in a case where the value of the SU-MIMO transmission configuration type field of CT 404a is 0, initiator 102 uses, as a recommended RX sector combination for the responder link, a recommended TX sector combination of initiator 102 indicated by grant frame 402.

Furthermore, responder 104 sets, by using antenna pattern reciprocity, a recommended TX sector combination to be used by responder 104 as a recommended RX sector combination of responder 104 corresponding to the recommended TX sector combination of initiator 102 indicated by grant frame 402.

Subsequently, initiator 102 transmits CT 406a and RTS frame 406 to initiator 102 to access a channel. Here, CT 406a includes, like CT 402a, information indicating that SU-MIMO transmission is to be used and information indicating a recommended TX sector combination to be used in SU-MIMO data transmission or a digital BF procedure for the initiator link.

Subsequently, after successfully receiving RTS frame 406, responder 104 transmits CT 408a and DMG CTS frame 408 to respond to initiator 102. Here, CT 408a includes information indicating that MIMO RX is prepared, information indicating that SU-MIMO transmission is to be used in a reverse direction, and information indicating a recommended TX sector combination to be used in SU-MIMO data transmission or a digital BF procedure for the responder link. Furthermore, CT 408a includes, like CT 404a, an SU-MIMO transmission configuration type field.

Subsequently, after successfully receiving DMG CTS frame 408, initiator 102 transmits data frame 410 to responder 104 by using the recommended TX sector combination indicated by CT 406a. In response to reception of data frame 410, responder 104 transmits ack frame 412 to respond to initiator 102.

<MU-MIMO BF Training>

According to Embodiment 1, MU-MIMO BF training enables initiator 102 and one or plural responders 104 in a group to establish an antenna configuration that enables initiator 102 to transmit EDMG MU PPDU to the responders in the group such that mutual interference between streams transmitted in a physical layer protocol data unit (PPDU) is minimized. MU-MIMO BF training includes a SISO phase and a MIMO phase that are consecutive.

The SISO phase collects feedback about TX of one or plural appropriate initiators and RX antennas of a responder, and sectors between the initiators and each responder in a group. The collected information may be used to execute the subsequent MIMO phase. The MIMO phase includes a downlink MIMO phase or an uplink MIMO phase. An SU-MIMO operation and an MU-MIMO operation are each an independent operation, and a terminal compatible with both the operations may perform either of them first.

<MU-MIMO BF Training: Downlink MIMO Phase: Non-Reciprocal MIMO Phase>

Figure 10:
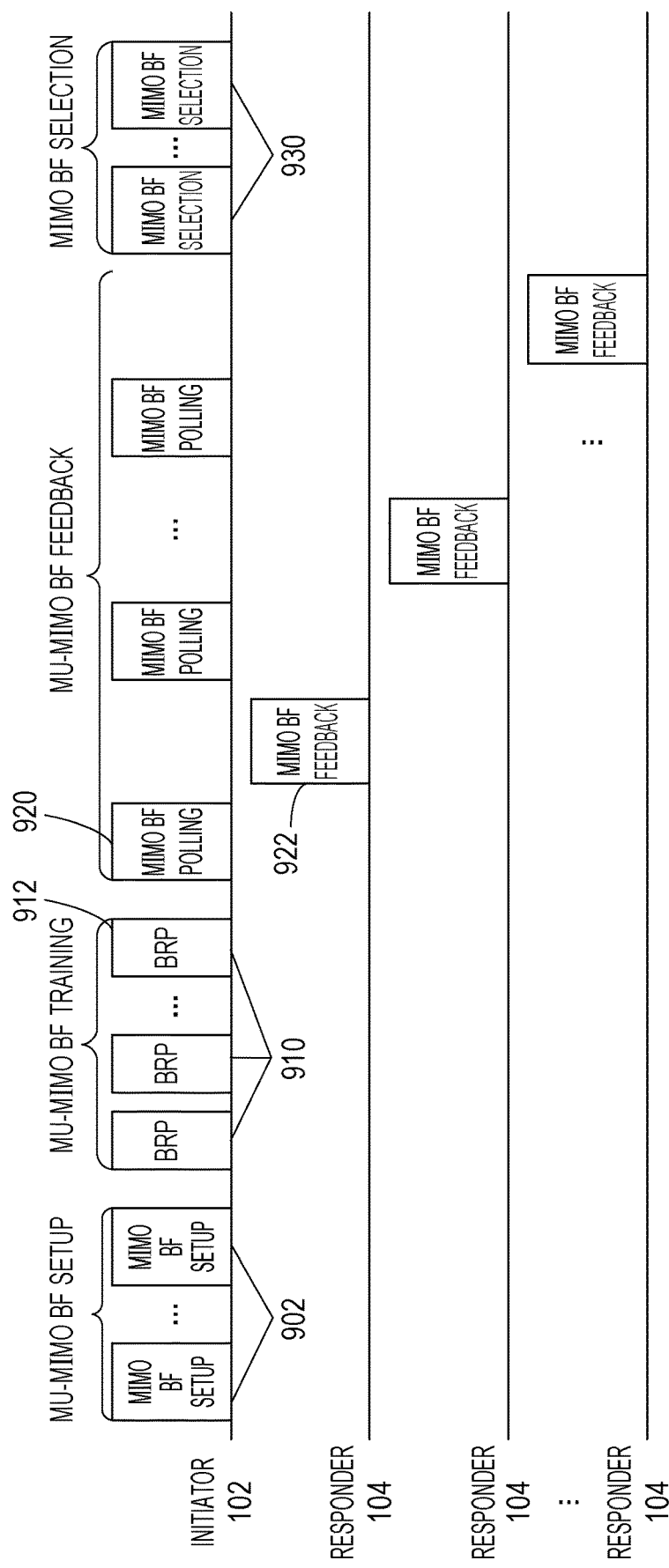
FIG. 10 is a diagram illustrating a downlink MIMO phase of MU-MIMO BF training according to Embodiment 1.

FIG. 10 illustrates a downlink MIMO phase of MU-MIMO BF training according to Embodiment 1. The downlink MIMO phase includes four subphases, an MU-MIMO BF setup subphase, an MU-MIMO BF training subphase, an MU-MIMO BF feedback subphase, and an MU-MIMO BF selection subphase.

In the MU-MIMO BF setup subphase of the downlink MIMO phase, initiator 102 first determines the number M of responders 104 in a group for performing training, on the basis of designation by the EDMG group and the group user mask illustrated in FIG. 5 in which the correspondence with a set of MAC addresses is predetermined. Subsequently, initiator 102 transmits one or plural MIMO BF setup frames 902 to M responders 104 in the group.

According to Embodiment 1, the SU/MU field and the DL/UL MU-MIMO phase field of the MIMO setup control element in MIMO BF setup frame 902 are set to 0 and 1, respectively, to indicate that the downlink MIMO phase is applied to MU-MIMO BF training. In addition, on the basis of the SNRs of TX sectors collected from the responders in the SISO phase, initiator 102 is capable of selecting a subset of candidate TX sectors for each antenna to reduce the time required for MU-MIMO BF training.

After transmitting MIMO BF setup frames 902, initiator 102 starts the MU-MIMO BF training subphase. In the MU-MIMO BF training subphase, initiator 102 transmits EDMG BRP-RX/TX packets 910 to responders 104.

After transmitting last EDMG BRP-RX/TX packet 912, initiator 102 starts the MU-MIMO BF feedback subphase. In the MU-MIMO BF feedback subphase, initiator 102 sequentially transmits MIMO BF polling frames to poll the individual responders in the group and collect MU-MIMO BF feedback.

Each responder 104 receives MIMO BF polling frame 920. Each responder 104 checks an address written on MIMO BF polling frame 920 and, in a case where a corresponding address is written, corresponding responder 104 transmits MIMO BF feedback frame 922 to initiator 102. The MIMO BF feedback frame indicates the SNR that has been obtained via channel measurement data acquired from the MU-MIMO BF training subphase and that corresponds to $N_{tsc}$ recommended TX sector combinations and $N_{tsc}$ recommended TX sector combinations. The MIMO BF feedback frame can include a channel measurement result corresponding to the $N_{tsc}$ recommended TX sector combinations. Here, $N_{tsc}$ means $N_{tsc(I)}$. In the downlink MIMO phase illustrated in FIG. 10, MU-MIMO training in the downlink direction is performed, and there is no responder link. Thus, $N_{tsc(I)}$ is referred to as $N_{tsc}$ for simplicity.

Prior to MU-MIMO BF feedback, initiator 102 polls each responder 104, and starts the MU-MIMO BF selection subphase after receiving a MIMO BF feedback frame from M-th responder 104, that is, last responder 104 in the group. In the MU-MIMO BF selection subphase, initiator 102 transmits one or plural MIMO BF selection frames 930 to individual responders 104 in the group. Each MIMO BF selection frame includes information about an MU-MIMO transmission configuration.

<MU-MIMO BF Training: Uplink MIMO Phase: Reciprocal MIMO Phase>

In a case where initiator 102 has antenna pattern reciprocity, initiator 102 starts an uplink MIMO phase of MU-MIMO BF training.

Figure 11:
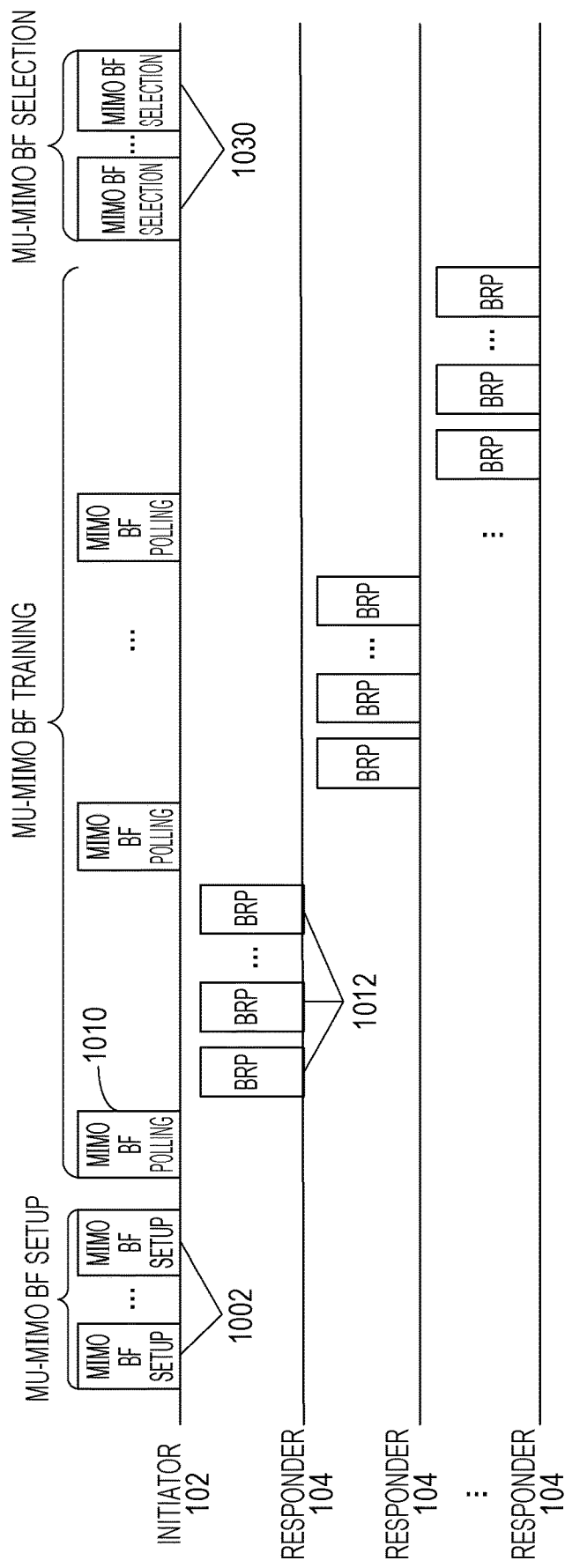
FIG. 11 is a diagram illustrating an uplink MIMO phase of MU-MIMO BF training according to Embodiment 1.

FIG. 11 illustrates an uplink MIMO phase of MU-MIMO BF training according to Embodiment 1. The uplink MIMO phase includes three subphases, an MU-MIMO BF setup subphase, an MU-MIMO BF training subphase, and an MU-MIMO BF selection subphase.

In the MU-MIMO BF setup subphase of the uplink MIMO phase, initiator 102 transmits one or plural MIMO BF setup frames 1002 to individual responders 104 in the group. According to Embodiment 1, both the SU/MU field and the DL/UL MU-MIMO phase field of the MIMO setup control element in MIMO BF setup frame 1002 are set to 0 to indicate that the uplink MIMO phase is applied to MU-MIMO BF training.

After transmitting MIMO BF setup frames 1002, initiator 102 starts the MU-MIMO BF training subphase. In the MU-MIMO BF training subphase, initiator 102 sequentially transmits MIMO BF polling frames 1010 to individual responders 104 in the group. Each MIMO BF polling frame 1010 includes information indicating the number of TRN subfields to be used for receive AWV training in EDMG BRP-RX/TX packet 1012 subsequently transmitted by corresponding responder 104. Each responder 104 receives MIMO BF polling frame 1010. Responder 104 corresponding to the address included in MIMO BF polling frame 1010 transmits one or plural EDMG BRP-RX/TX packets 1012 to initiator 102.

On the basis of the number M of responders 104 in the group designated by the EDMG group ID and the group user mask illustrated in FIG. 5, initiator 102 starts the MU-MIMO BF selection subphase after receiving the last EDMG BRP-RX/TX packet from M-th responder 104 in the group, that is, last responder 104 in the group. In the MU-MIMO BF selection subphase, initiator 102 transmits one or plural MIMO BF selection frames 1030 to individual responders 104 in the group. Each MIMO BF selection frame includes information about an MU-MIMO transmission configuration.

<Flowchart>

Figure 12:
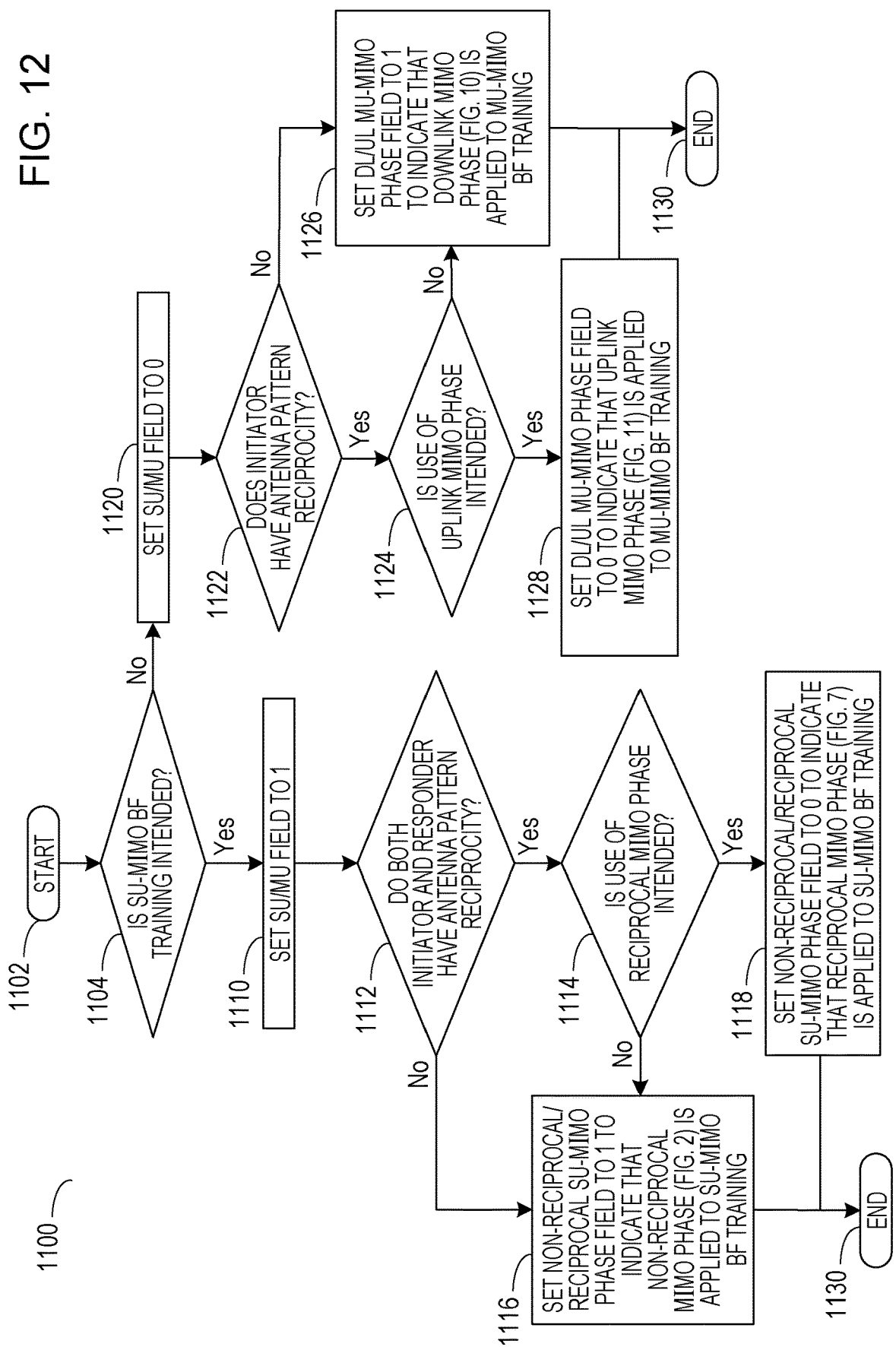
FIG. 12 is a flowchart for setting information fields of a MIMO setup control element according to Embodiment 1.

FIG. 12 illustrates flowchart 1100 for setting the information fields of MIMO setup control element 400 according to Embodiment 1. Flowchart 1100 starts from step 1102. In step 1104, initiator 102 determines whether SU-MIMO or MU-MIMO BF training is intended. In a case where SU-MIMO BF training is intended (Yes in step 1104), flowchart 1100 proceeds to step 1110. Otherwise (No in step 1104), flowchart 1100 proceeds to step 1120.

In step 1110, the SU/MU field of MIMO setup control element 400 is set to 1 to indicate that SU-MIMO BF training is intended. In step 1120, the SU/MU field of MIMO setup control element 400 is set to 0 to indicate that SU-MIMO BF training is not intended.

In step 1112, initiator 102 evaluates whether both initiator 102 and responder 104 have antenna pattern reciprocity. In a case where both initiator 102 and responder 104 have antenna pattern reciprocity (Yes in step 1112), flowchart 1100 proceeds to step 1114. Otherwise (No in step 1112), flowchart 1100 proceeds to step 1116.

In step 1116, the non-reciprocal/reciprocal SU-MIMO phase field of MIMO setup control element 400 is set to 1 to indicate that the non-reciprocal MIMO phase (see FIG. 2) is applied to SU-MIMO BF training. Subsequently, flowchart 1100 ends in step 1130.

In step 1114, initiator 102 determines whether the reciprocal MIMO phase is intended to be applied to SU-MIMO BF training. In a case where the reciprocal MIMO phase is intended to be applied to SU-MIMO BF training (Yes in step 1114), the non-reciprocal/reciprocal SU-MIMO phase field of MIMO setup control element 400 is set to 0 to indicate that the reciprocal MIMO phase (see FIG. 7) is applied to SU-MIMO BF training in step 1118, and subsequently flowchart 1100 ends in step 1130. In a case where the reciprocal MIMO phase is not intended to be applied to SU-MIMO BF training (No in step 1114), flowchart 1100 proceeds to step 1116.

In step 1120, the SU/MU field of MIMO setup control element 400 is set to 0. Subsequently, in step 1122, initiator 102 evaluates whether initiator 102 has antenna pattern reciprocity. In a case where initiator 102 has antenna pattern reciprocity (Yes in step 1122), flowchart 1100 proceeds to step 1124. Otherwise (No in step 1122), flowchart 1100 proceeds to step 1126, where the DL/UL MU-MIMO phase field of MIMO setup control element 400 is set to 1 to indicate that the downlink MIMO phase (see FIG. 10) is applied to MU-MIMO BF training. Subsequently, flowchart 1100 ends in step 1130.

In step 1124, initiator 102 determines whether the uplink MIMO phase is intended to be applied to MU-MIMO BF training. In a case where the uplink MIMO phase is intended to be applied to MU-MIMO BF training (Yes in step 1124), flowchart 1100 proceeds to step 1128. Otherwise (No in step 1124), flowchart 1100 proceeds to step 1126.

In step 1128, the DL/UL MU-MIMO phase field of MIMO setup control element 400 is set to 0 to indicate that the uplink MIMO phase (see FIG. 11) is applied to MU-MIMO BF training, and subsequently flowchart 1100 ends in step 1130. Otherwise (No in step 1124), flowchart 1100 proceeds to step 1126.

Figure 13:
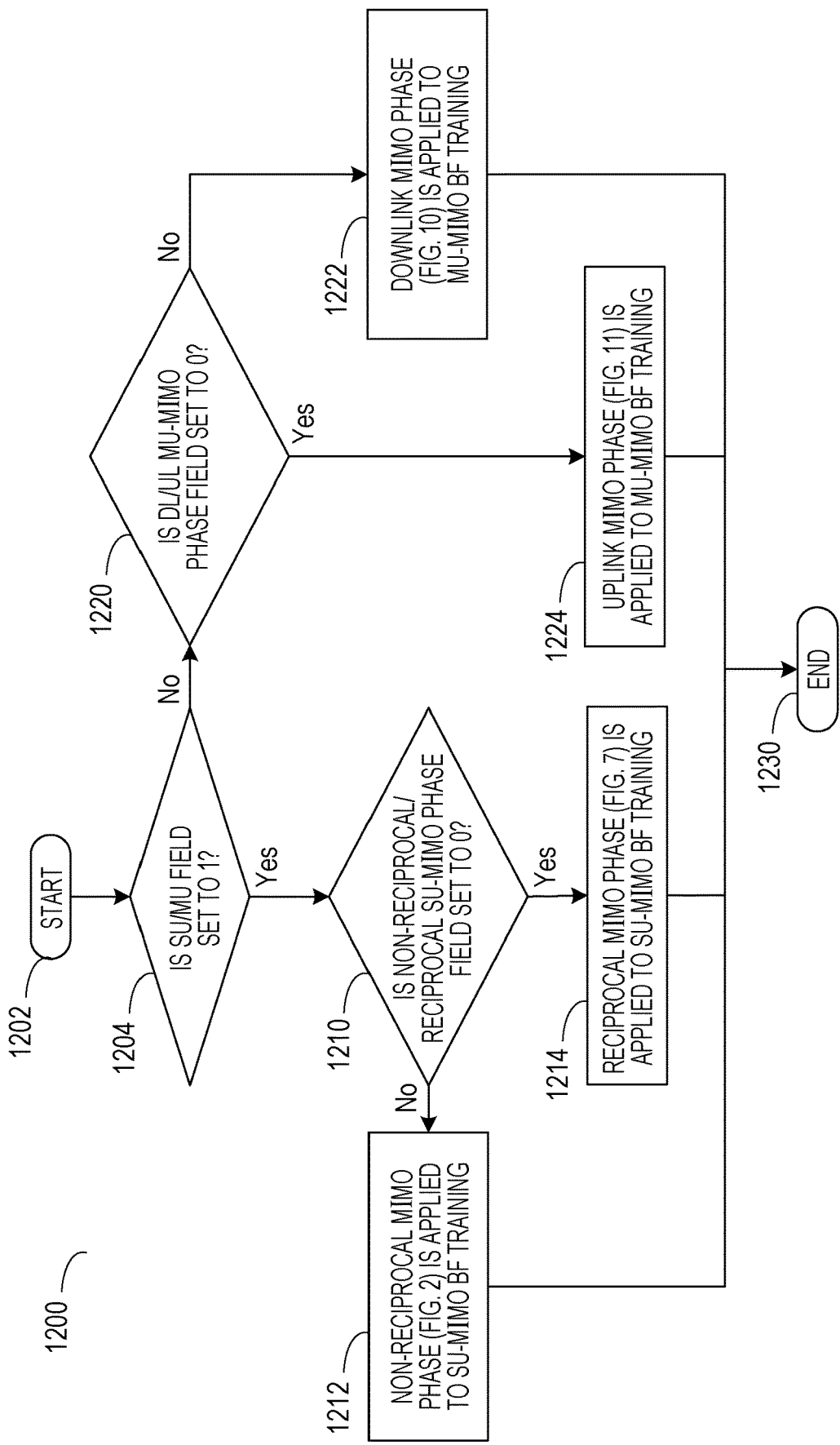
FIG. 13 is a flowchart for interpreting the information fields of the MIMO setup control element according to Embodiment 1.

FIG. 13 illustrates flowchart 1200 for interpreting the information fields of MIMO setup control element 400 according to Embodiment 1. Flowchart 1200 starts from step 1202. In step 1204, responder 104 that has received MIMO setup control element 400 checks whether the SU/MU field is set to 1. In a case where the SU/MU field is set to 1 (Yes in step 1204), flowchart 1200 proceeds to step 1210. In a case where the SU/MU field is set to 0 (No in step 1204), flowchart 1200 proceeds to step 1220.

In step 1210, responder 104 checks whether the non-reciprocal/reciprocal SU-MIMO phase field of received MIMO setup control element 400 is set to 0. In a case where the non-reciprocal/reciprocal SU-MIMO phase field is set to 0 (Yes in step 1210), flowchart 1200 proceeds to step 1214. In a case where the non-reciprocal/reciprocal SU-MIMO phase field is set to 1 (No in step 1210), flowchart 1200 proceeds to step 1212.

In step 1214, responder 104 determines that the reciprocal MIMO phase is applied to SU-MIMO BF training, and flowchart 1200 ends in step 1230. In step 1212, responder 104 determines that the non-reciprocal MIMO phase is applied to SU-MIMO BF training, and flowchart 1200 ends in step 1230.

In step 1220, responder 104 checks whether the DL/UL MU-MIMO phase field of received MIMO setup control element 400 is set to 0. In a case where the DL/UL MU-MIMO phase field is set to 0 (Yes in step 1220), flowchart 1200 proceeds to step 1224. In a case where the DL/UL MU-MIMO phase field is set to 1 (No in step 1220), flowchart 1200 proceeds to step 1222.

In step 1224, responder 104 determines that the uplink MIMO phase is applied to MU-MIMO BF training, and flowchart 1200 ends in step 1230. In step 1222, responder 104 determines that the downlink MIMO phase is applied to MU-MIMO BF training, and flowchart 1200 ends in step 1230.

According to Embodiment 1, with use of a condition in which both initiator 102 and responder 104 have antenna pattern reciprocity, the R-SMBT subphase is omitted and the SU-MIMO BF feedback subphase is simplified. Accordingly, the time required for SU-MIMO BF training can be reduced compared with the non-reciprocal MIMO phase illustrated in FIG. 2.

In addition, according to Embodiment 1, even in a case where the reciprocal MIMO phase is applied to SU-MIMO BF training, initiator 102 may determine an appropriate transmission parameter, for example, a MCS, to be used for communication with responder 104 that has transmitted MIMO BF feedback 922 illustrated in FIG. 10, on the basis of MIMO channel quality information included in MIMO BF feedback 922, for example, the SNR. In addition, initiator 102 may determine an appropriate transmission parameter, for example, a MCS, to be used for communication with responder 104 that has transmitted BRP frame 1012 illustrated in FIG. 11, in accordance with the reception quality of BRP frame 1012. In this way, initiator 102 is capable of determining an appropriate transmission parameter, for example, a MCS, to be used for communication with responder 104 after the digital BF procedure has been executed. In the reciprocal MIMO phase, initiator 102 may omit notifying responder 104 of information about receive sectors, and thus the time required for SU-MIMO BF training can be reduced.

In addition, according to Embodiment 1, it is understood that, in a case where initiator 102 has antenna pattern reciprocity, the MU-MIMO BF feedback subphase is omitted in the uplink MIMO phase illustrated in FIG. 11, compared with the downlink MIMO phase illustrated in FIG. 10. As a result of the MU-MIMO BF feedback subphase being omitted, the time required for MU-MIMO BF training can be reduced.

[Modification Example 1]

In Embodiment 1 described above, in the digital BF procedure illustrated in FIG. 8A or FIG. 8B, responder 104 determines an appropriate MCS to be used by responder 104 on the basis of MIMO BF feedback frame 714 transmitted by responder 104 in response to EDMG BRP-TX packet 712 transmitted by initiator 102. In contrast to this, in Modification Example 1, an opportunity to transmit feedback of the SNR for the responder link is acquired so that responder 104 is capable of determining an appropriate MCS on the basis of the SNR even in a case where the digital BF procedure cannot be used.

Figure 14:
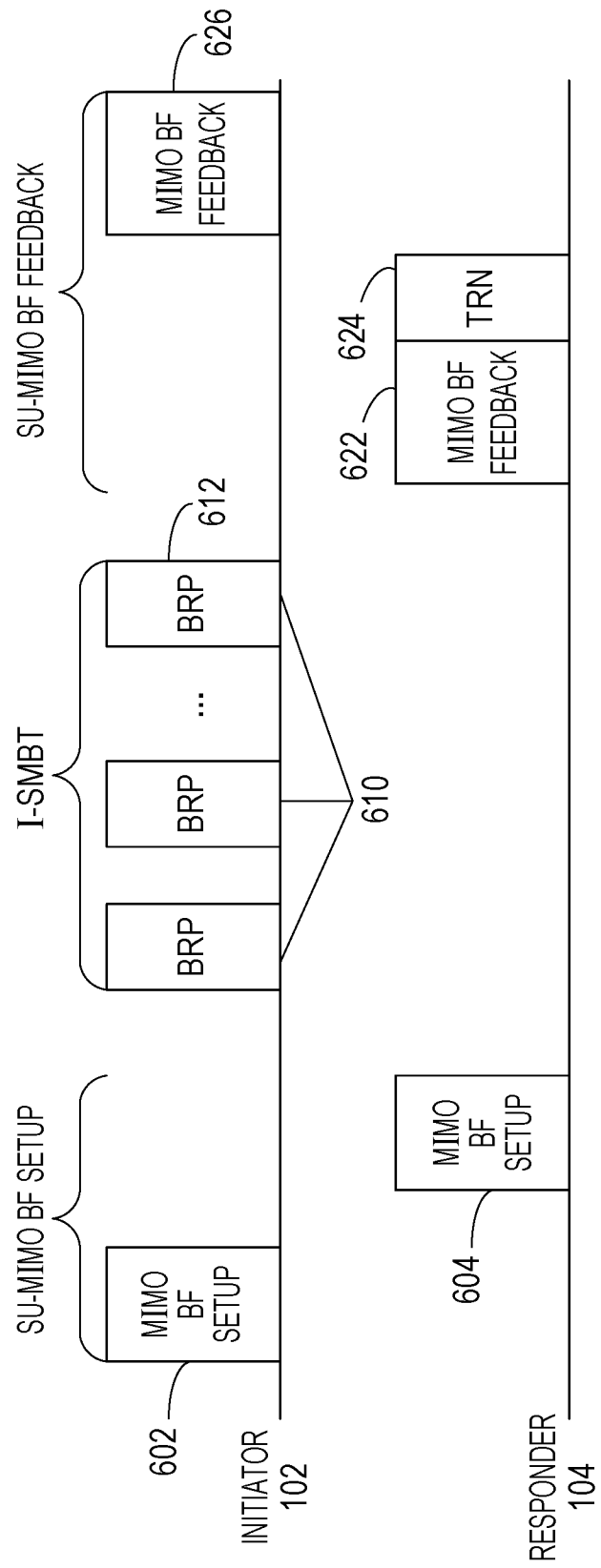
FIG. 14 is a diagram illustrating a reciprocal MIMO phase of SU-MIMO BF training according to Modification Example 1.

FIG. 14 illustrates a reciprocal MIMO phase of SU-MIMO BF training according to Modification Example 1. In one example, TRN field 624 is added to MIMO BF feedback frame 622 that is transmitted by responder 104 to transmit feedback of the SNR, as illustrated in FIG. 14.

TRN field 624 is determined on the basis of recommended TX/RX sector combinations for the initiator link, and is transmitted by responder 104 by using recommended RX/TX sector combinations for the responder link. In one example, one or plural TRN units that are at the head of TRN field 624, that are added to MIMO BF feedback frame 622, and that cannot be processed by initiator 102 may be used by initiator 102 to switch the antenna configuration on the basis of the recommended RX/TX sector combinations for the responder link.

Subsequently, initiator 102 transmits MIMO BF feedback frame 626 (a third MIMO BF feedback frame) including feedback of the SNR for the responder link.

MIMO BF setup frame 602, MIMO BF setup frame 604, and EDMG BRP-RX/TX packets 610 illustrated in FIG. 14 are similar to those illustrated in FIG. 7, and the description thereof is omitted.

According to Modification Example 1, even in a case where hybrid BF cannot be used, responder 104 is capable of determining an appropriate MCS to be used by responder 104 on the basis of feedback of the SNR for the responder link included in MIMO BF feedback frame 626. In Embodiment 1, appropriate MCSs to be used by initiator 102 and responder 104 are determined through the SU-MIMO BF training illustrated in FIG. 7 and the digital BF procedure illustrated in FIG. 8A or FIG. 8B. In contrast to this, in Modification Example 1, appropriate MCSs to be used by initiator 102 and responder 104 can be determined through the SU-MIMO BF training illustrated in FIG. 14. Initiator 102 may measure digital BF instead of measuring the SNR of the responder link, by using TRN field 624 illustrated in FIG. 14.

[Modification Example 2]

In Modification Example 1 described above, responder 104 determines an appropriate MCS to be used by responder 104 on the basis of feedback of the SNR for the responder link transmitted by initiator 102. Alternatively, in Modification Example 2, responder 104 determines an appropriate MCS to be used by responder 104 on the basis of information indicating a transmission power transmitted by initiator 102.

Figure 15:
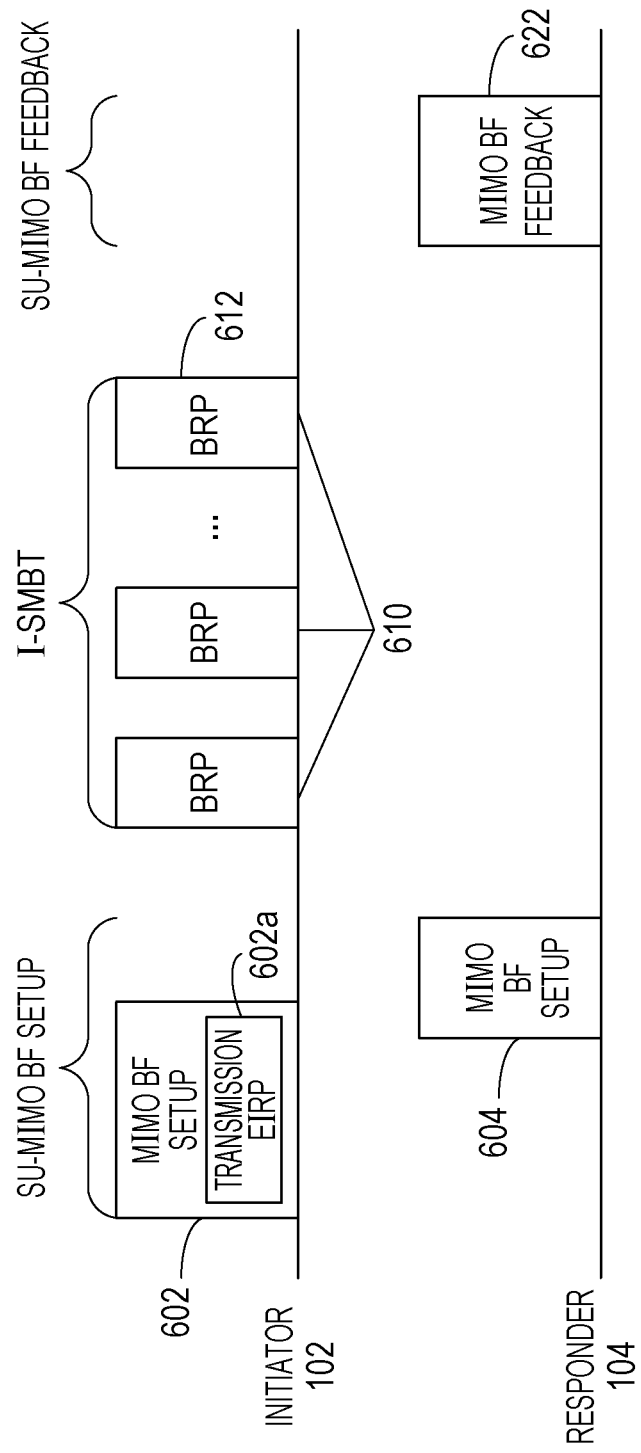
FIG. 15 is a diagram illustrating a reciprocal MIMO phase of SU-MIMO BF training according to Modification Example 2.

FIG. 15 illustrates a reciprocal MIMO phase of SU-MIMO BF training according to Modification Example 2. As illustrated in FIG. 15, for example, MIMO BF setup frame 602 transmitted by initiator 102 includes transmission EIRP field 602a indicating a transmission equivalent isotropic radiated power (EIRP) of initiator 102. Field 602a indicating the transmission EIRP may be inserted after, for example, the non-reciprocal/reciprocal SU-MIMO phase field of MIMO setup control element 400 illustrated in FIG. 5.

With use of a value $P_{I,\ TX}$ of the transmission EIRP indicated in transmission EIRP field 602a, responder 104 is capable of calculating a value $RSSI_I$ of RSSI of initiator 102 by using the following equation.

$$RSSI_I = P_{R,\ TX} - P_{I,\ TX} + RSSI_R$$

Here, $P_{I,\ TX}$ represents the value of the transmission EIRP of responder 104, and $RSSI_R$ represents the value of RSSI of responder 104. The values of $P_{I,\ TX}$ and $RSSI_R$ are known to responder 104.

Subsequently, responder 104 is capable of determining an appropriate MCS to be used by responder 104 on the basis of the calculated value of $RSSI_I$.

MIMO BF setup frame 604, EDMG BRP-RX/TX packets 610, and MIMO BF feedback frame 622 illustrated in FIG. 15 are similar to those illustrated in FIG. 7, and the description thereof is omitted.

According to Modification Example 2, even in a case where hybrid BF cannot be used, responder 104 is capable of determining an appropriate MCS to be used by responder 104 on the basis of the transmission EIRP of initiator 102. In Embodiment 1, appropriate MCSs to be used by initiator 102 and responder 104 are determined through the SU-MIMO BF training illustrated in FIG. 7 and the digital BF procedure illustrated in FIG. 8A or FIG. 8B. In contrast to this, in Modification Example 2, appropriate MCSs to be used by initiator 102 and responder 104 can be determined through the SU-MIMO BF training illustrated in FIG. 15.

[Modification Example 3]

In Modification Example 3, a case is considered in which both initiator 102 and responder 104 have antenna pattern reciprocity. In Modification Example 3, transmission and reception of frames or packets corresponding to MIMO BF setup frame 204, I-SMBT, and MIMO BF feedback 234 among the frames illustrated in FIG. 2 transmitted and received in the non-reciprocal MIMO phase are omitted.

Figure 16:
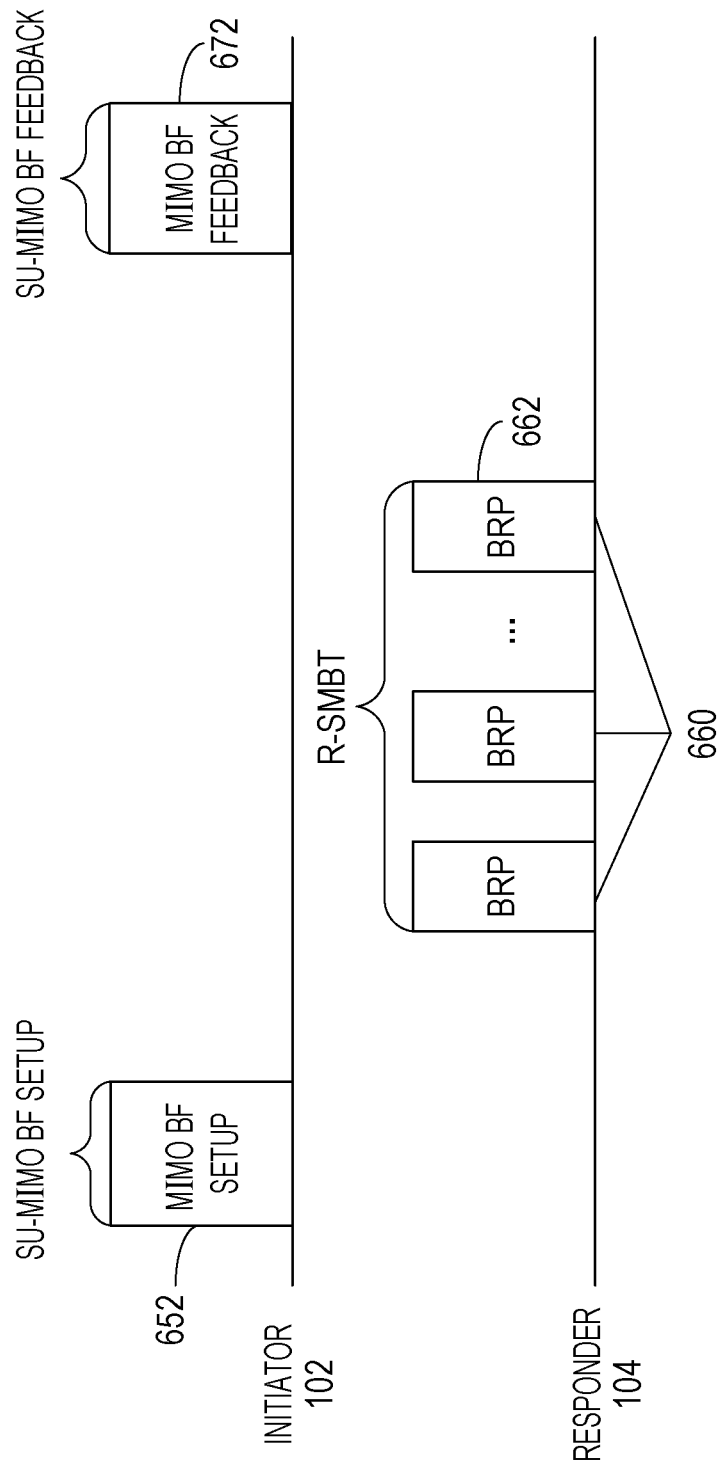
FIG. 16 is a diagram illustrating a reciprocal MIMO phase of SU-MIMO BF training according to Modification Example 3.

FIG. 16 illustrates a reciprocal MIMO phase of SU-MIMO BF training according to Modification Example 3. The reciprocal MIMO phase of Modification Example 3 is formed of three subphases, an SU-MIMO BF setup subphase, an R-SMBT subphase, and an SU-MIMO BF feedback subphase. In the reciprocal MIMO phase of Modification Example 3, transmission and reception of frames or packets corresponding to MIMO BF setup frame 204, I-SMBT for the responder link, and MIMO BF feedback 234 for I-SMBT among the frames illustrated in FIG. 2 transmitted and received in the non-reciprocal MIMO phase can be omitted.

In the SU-MIMO BF setup subphase, initiator 102 transmits MIMO BF setup frame 652 to responder 104. In Modification Example 3, the values of the SU/MU field and the non-reciprocal/reciprocal SU-MIMO phase field of the MIMO setup control element in MIMO BF setup frame 652 are set to 1 and 0, respectively, to indicate that the reciprocal MIMO phase is applied to SU-MIMO BF training. The value of the link type field is set to 0 to indicate that the configuration information included in MIMO BF setup frame 652 is about the responder link.

Subsequently, responder 104 starts the R-SMBT subphase. In the R-SMBT subphase, responder 104 transmits EDMG BRP-RX/TX packets 660 (a third BRP packet) to initiator 102. The number of TRN subfields of each EDMG BRP-RX/TX packet 660 is configured in accordance with the TRN configuration information in MIMO BF setup frame 652 received from initiator 102 in the SU-MIMO BF setup subphase.

After receiving last EDMG BRP-RX/TX packet 662 from responder 104, initiator 102 starts the SU-MIMO BF feedback subphase. Initiator 102 transmits MIMO BF feedback frame 672 to responder 104. MIMO BF feedback frame 672 includes information indicating a recommended TX sector combination for the responder link determined on the basis of channel measurement data acquired from the R-SMBT subphase, and information indicating the SNR corresponding to the recommended TX sector combination. In addition, MIMO BF feedback frame 672 may include information indicating a channel measurement result corresponding to the recommended TX sector combination.

In Modification Example 3, in the reciprocal MIMO phase of SU-MIMO BF training illustrated in FIG. 16, recommended RX/TX sector combinations determined for the responder link, that is, recommended RX/TX sector combinations, are handled as recommended TX/RX sector combinations for the initiator link.

On the basis of the recommended TX/RX sector combinations for the initiator link, initiator 102 determines a recommended TX sector combination to be used by initiator 102 for the initiator link. The recommended TX sector combination to be used by initiator 102 for the initiator link may be the same as the recommended RX sector combination to be used by initiator 102 for the responder link.

On the basis of the recommended TX/RX sector combinations for the initiator link, responder 104 determines a recommended RX sector combination to be used by responder 104 for the initiator link. The recommended RX sector combination to be used by responder 104 for the initiator link may be the same as the recommended TX sector combination to be used by responder 104 for the responder link.

In Embodiment 1, appropriate MCSs to be used by initiator 102 and responder 104 are determined through the SU-MIMO BF training illustrated in FIG. 7 and the digital BF procedure illustrated in FIG. 8A or FIG. 8B. In contrast to this, in Modification Example 3, appropriate MCSs to be used by initiator 102 and responder 104 can be determined through the SU-MIMO BF training illustrated in FIG. 16.

According to Modification Example 3, with use of a condition in which both initiator 102 and responder 104 have antenna pattern reciprocity, the I-SMBT subphase is omitted and the SU-MIMO BF setup subphase and the SU-MIMO BF feedback subphase are simplified. Accordingly, the time required for SU-MIMO BF training can be reduced compared with the non-reciprocal MIMO phase illustrated in FIG. 2.

In addition, in Embodiment 1, two MIMO BF setup frames 602 and 604 are transmitted and received in a two-way manner in the SU-MIMO BF setup phase as illustrated in FIG. 7. In contrast to this, in Modification Example 3, one MIMO BF setup frame 652 is transmitted and received in a one-way manner in the SU-MIMO BF setup phase as illustrated in FIG. 16. Thus, in the SU-MIMO BF setup phase in Modification Example 3, the execution time can be shortened compared with the SU-MIMO BF setup phase in Embodiment 1.

Figure 17:
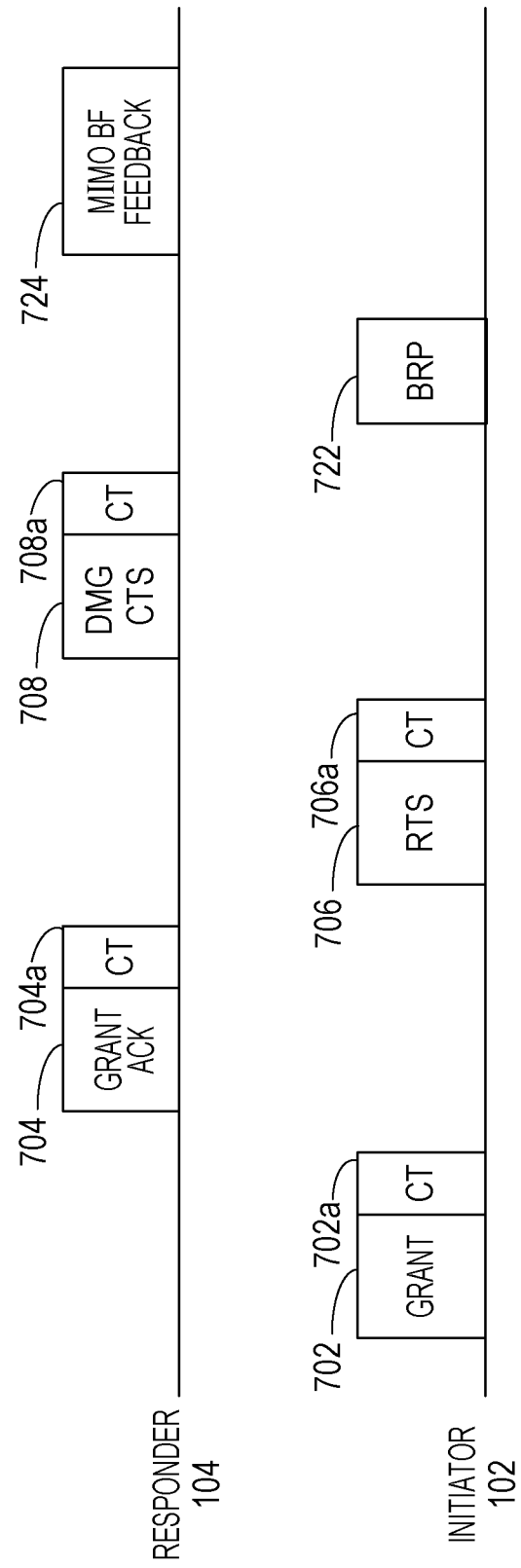
FIG. 17 is a diagram illustrating an example of a digital BF procedure according to Modification Example 3.

FIG. 17 illustrates an example of a digital BF procedure according to Modification Example 3. In Embodiment 1, digital BF is applied to the responder link. In contrast to this, in Modification Example 3, digital BF is applied to the initiator link. In Embodiment 1, the SU-MIMO BF training (analog BF procedure) illustrated in FIG. 7 is performed and then the digital BF procedure illustrated in FIG. 8A or FIG. 8B is performed. In contrast to this, in Modification Example 3, the analog BF procedure illustrated in FIG. 16 is performed and then the digital BF procedure illustrated in FIG. 17 is performed.

First, initiator 102 transmits CT 702a and grant frame 702 to responder 104. Here, CT 702a indicates the antenna configuration used for the initiator link in the digital BF procedure.

Subsequently, after successfully receiving grant frame 702, responder 104 transmits CT 704a and grant ack frame 704 to respond to initiator 102. Here, CT 704a indicates the antenna configuration used for the responder link in the digital BF procedure.

Subsequently, initiator 102 transmits CT 706a and RTS frame 706 to responder 104 to access a channel, and makes a notification about the start of the digital BF procedure for the responder link. Here, CT 706a indicates the antenna configuration used for the initiator link in the digital BF procedure.

Subsequently, after successfully receiving RTS frame 706, responder 104 transmits CT 708a and DMG CTS frame 708 to respond to initiator 102. Here, CT 708a includes information indicating the antenna configuration used for the responder link in the digital BF procedure. Furthermore, initiator 102 configures array antennas for the initiator link on the basis of the antenna configuration information in grant frame 702.

Subsequently, initiator 102 transmits EDMG BRP-TX packet 722 (a fourth BRP packet) illustrated in FIG. 17, thereby sounding a channel for the initiator link. EDMG BRP-TX packet 722 is transmitted with the antenna configuration for the initiator link based on the result of the SU-MIMO BF training illustrated in FIG. 16.

Subsequently, responder 104 transmits MIMO BF feedback frame 724 (a fourth MIMO BF feedback frame) including the SNR, MIMO channel measurement, or digital precoding matrix information for the initiator link, to respond to initiator 102.

In Embodiment 1, BRP frame 612 is transmitted in the initiator link in the analog BF procedure, and BRP frame 712 is transmitted in the responder link in the digital BF procedure. In contrast to this, in Modification Example 3, BRP frame 662 is transmitted in the responder link in the analog BF procedure, and BRP frame 722 is transmitted in the initiator link in the digital BF procedure. In Modification Example 3, as in Embodiment 1, BRP frames are transmitted in directions reverse to each other in the analog BF procedure and the digital BF procedure. Accordingly, even in a case where I-SMBT or R-SMBT is omitted, the SNRs of the respective links can be measured.

As a result of the above-described procedure, initiator 102 obtains feedback of the SNR for the initiator link by using hybrid BF and determines an appropriate MCS on the basis of the SNR.

In this way, even in a case where the reciprocal MIMO phase is applied to SU-MIMO BF training, initiator 102 is capable of determining an appropriate transmission parameter for the initiator link, for example, a MCS, after the digital BF procedure has been executed.

According to Modification Example 3, in the reciprocal MIMO phase, responder 104 may omit notifying initiator 102 of information about receive sectors, and thus the time required for SU-MIMO BF training can be reduced.

Modification Example 1 and Modification Example 3 may be combined to produce Modification Example 4. In Modification Example 4, a TRN field is added to MIMO BF feedback frame 672 illustrated in FIG. 16, and MIMO BF feedback frame 672 and the TRN field are transmitted by initiator 102 by using recommended RX/TX sector combinations for the initiator link. The recommended RX/TX sector combinations for the initiator link are determined on the basis of recommended TX/RX sector combinations for the responder link. (See FIG. 14. Note that, in FIG. 14, responder 104 transmits TRN field 624.)

Subsequently, responder 104 transmits a MIMO BF feedback frame including feedback of the SNR for the initiator link. (See FIG. 14. Note that, in FIG. 14, initiator 102 transmits MIMO BF feedback frame 626.)

According to Modification Example 4, even in a case where hybrid BF cannot be used, initiator 102 is capable of determining an appropriate MCS to be used by initiator 102 on the basis of the SNR of the initiator link.

Embodiment 2

In Embodiment 2, the downlink MIMO phase in MU-MIMO BF (see FIG. 10) is referred to as a non-reciprocal MIMO phase. On the other hand, the uplink MIMO phase (see FIG. 11) is referred to as a reciprocal MIMO phase because the uplink MIMO phase uses the antenna pattern reciprocity of initiator 102.

FIG. 18 illustrates an example of a format of MIMO setup control element 1300 according to Embodiment 2. MIMO setup control element 1300 includes an SU/MU field, a non-reciprocal/reciprocal MIMO phase field, and an initiator field. The SU/MU field indicates whether SU-MIMO or MU-MIMO BF is applied. The non-reciprocal/reciprocal MIMO phase field indicates which of a non-reciprocal MIMO phase and a reciprocal MIMO phase is applied to SU-MIMO BF training or MU-MIMO BF training. The initiator field indicates which of initiator 102 and responder 104 is the transmission source of MIMO setup control element 1300.

Initiator 102 may transmit MIMO setup control element 1300 by including it in MIMO BF setup frame 602, 902, 1002, or 652. Responder 104 may transmit MIMO setup control element 1300 by including it in MIMO BF setup frame 604.

In Embodiment 2, the initiator field is used, instead of the link type field in Embodiment 1, in the MIMO setup control element.

As described above, the link type field in FIG. 5 indicates whether configuration information is information about the initiator link or information about the responder link. In contrast to this, MIMO setup control element 1300 includes information about both the initiator link and the responder link, information about the initiator link, and information about the responder link. This will be described.

The information about both the initiator link and the responder link includes, for example, information on the SU/MU field, an EDMG group ID field, and a group user mask field. The SU/MU field indicates which of SU-MIMO BF and MU-MIMO BF is to be executed, and is thus information about both the initiator link and the responder link. In the case of MU-MIMO BF, the IDs of communication devices that participate in MU-MIMO BF are determined by combining the EDMG group ID field and the group user mask field.

In a case where MIMO setup control element 1300 is transmitted by initiator 102, the information about the initiator link includes, for example, information on a MIMO FBCK-REQ field and a transmission power field. The MIMO FBCK-REQ field indicates channel measurement feedback requested for the initiator link. The transmission power field indicates the transmission power of the initiator link. In a case where MIMO setup control element 1300 is transmitted by responder 104, each field indicates information about the responder link.

In a case where MIMO setup control element 1300 is transmitted by initiator 102, the information about the responder link includes, for example, information on an L-TX-RX field and a requested EDMG TRN unit M field. The L-TX-RX field and the requested EDMG TRN unit M field indicate the number of TRN subfields requested for receive AWV training for the responder link. In a case where MIMO setup control element 1300 is transmitted by responder 104, each field indicates information about the initiator link.

Initiator 102 includes, in MIMO setup control element 1300, an initiator field indicating which of initiator 102 and responder 104 is a transmitter of MIMO setup control element 1300. Responder 104 that has received MIMO setup control element 1300 is capable of determining, by using the value indicated by the initiator field, which of the information about the initiator link and the responder link, the information about the initiator link, and the information about the responder link is the configuration information (information in each field) of MIMO setup control element 1300.

The initiator field is included in MIMO setup control element 1300 also in a case where responder 104 transmits MIMO setup control element 1300. Thus, responder 104 is capable of discriminating the configuration information (information in each field) of MIMO setup control element 1300 by using the value indicated by the initiator field.

In Embodiment 2, the SU/MU field and the non-reciprocal/reciprocal MIMO phase field in the format of MIMO setup control element 1300 in FIG. 18 indicate which of the non-reciprocal MIMO phase of SU-MIMO BF training illustrated in FIG. 2, the reciprocal MIMO phase of SU-MIMO BF training illustrated in FIG. 7, the non-reciprocal MIMO phase of MU-MIMO BF training illustrated in FIG. 10, and the reciprocal MIMO phase of MU-MIMO BF training illustrated in FIG. 11 is to be used.

In the case of executing the non-reciprocal MIMO phase of SU-MIMO BF training illustrated in FIG. 2, both the SU/MU field and the non-reciprocal/reciprocal MIMO phase field of MIMO setup control element 1300 in MIMO BF setup frame 202 or MIMO BF setup frame 204 are set to 0 to indicate that the non-reciprocal MIMO phase is applied to SU-MIMO BF training. The initiator field of MIMO setup control element 1300 in MIMO BF setup frame 202 is set to 1 to indicate that the transmission source of MIMO BF setup frame 202 is initiator 102. The initiator field of MIMO setup control element 1300 in MIMO BF setup frame 204 is set to 0 to indicate that the transmission source of MIMO BF setup frame 204 is responder 104.

In the case of executing the reciprocal MIMO phase of SU-MIMO BF training illustrated in FIG. 7, both the SU/MU field and the non-reciprocal/reciprocal MIMO phase field of MIMO setup control element 1300 in MIMO BF setup frame 602 or MIMO BF setup frame 604 are set to 0 and 1, respectively, to indicate that the reciprocal MIMO phase is applied to SU-MIMO BF training. The initiator field of MIMO setup control element 1300 in MIMO BF setup frame 602 is set to 1 to indicate that the transmission source of MIMO BF setup frame 602 is initiator 102. The initiator field of MIMO setup control element 1300 in MIMO BF setup frame 604 is set to 0 to indicate that the transmission source of MIMO BF setup frame 604 is responder 104.

In the case of executing the non-reciprocal MIMO phase of MU-MIMO BF training illustrated in FIG. 10, both the SU/MU field and the non-reciprocal/reciprocal MIMO phase field of MIMO setup control element 1300 in MIMO BF setup frame 902 are set to 1 and 0, respectively, to indicate that the non-reciprocal MIMO phase is applied to MU-MIMO BF training. The initiator field of MIMO setup control element 1300 in MIMO BF setup frame 902 is set to 1 to indicate that the transmission source of MIMO BF setup frame 902 is initiator 102.

In the case of executing the reciprocal MIMO phase of MU-MIMO BF training illustrated in FIG. 11, both the SU/MU field and the non-reciprocal/reciprocal MIMO phase field of MIMO setup control element 1300 in MIMO BF setup frame 1002 are set to 1 to indicate that the reciprocal MIMO phase is applied to MU-MIMO BF training. The initiator field of MIMO setup control element 1300 in MIMO BF setup frame 1002 is set to 1 to indicate that the transmission source of MIMO BF setup frame 1002 is initiator 102.

<Flowchart>

FIG. 19 illustrates flowchart 1400 for setting the information fields of MIMO setup control element 1300 according to Embodiment 2. Flowchart 1400 starts from step 1402. In step 1404, initiator 102 determines whether SU-MIMO or MU-MIMO BF training is intended. In a case where SU-MIMO BF training is intended (Yes in step 1404), flowchart 1400 proceeds to step 1410. Otherwise (No in step 1404), flowchart 1400 proceeds to step 1420.

In step 1410, the SU/MU field of MIMO setup control element 1300 is set to 0 to indicate that SU-MIMO BF training is intended.

In step 1412, initiator 102 evaluates whether both initiator 102 and responder 104 have antenna pattern reciprocity. In a case where both initiator 102 and responder 104 have antenna pattern reciprocity (Yes in step 1412), flowchart 1400 proceeds to step 1414. Otherwise (No in step 1412), flowchart 1400 proceeds to step 1416.

In step 1416, the non-reciprocal/reciprocal MIMO phase field of MIMO setup control element 1300 is set to 0 to indicate that the non-reciprocal MIMO phase (see FIG. 2) is applied to SU-MIMO BF training. Subsequently, flowchart 1400 ends in step 1430.

In step 1414, initiator 102 determines whether the reciprocal MIMO phase is intended to be applied to SU-MIMO BF training. In a case where the reciprocal MIMO phase is intended to be applied to SU-MIMO BF training (Yes in step 1414), flowchart 1400 proceeds to step 1418. Otherwise (No in step 1414), flowchart 1400 proceeds to step 1416.

In step 1418, the non-reciprocal/reciprocal MIMO phase field of MIMO setup control element 1300 is set to 1 to indicate that the reciprocal MIMO phase (see FIG. 7) is applied to SU-MIMO BF training, and subsequently flowchart 1400 ends in step 1430.

In step 1420, the SU/MU field of MIMO setup control element 1300 is set to 1 to indicate that MU-MIMO BF training is intended.

In step 1422, initiator 102 evaluates whether initiator 102 has antenna pattern reciprocity. In a case where initiator 102 has antenna pattern reciprocity (Yes in step 1422), flowchart 1400 proceeds to step 1424. Otherwise (No in step 1422), flowchart 1400 proceeds to step 1426.

In step 1426, the non-reciprocal/reciprocal MIMO phase field of MIMO setup control element 1300 is set to 0 to indicate that the non-reciprocal MIMO phase (see FIG. 10) is applied to MU-MIMO BF training. Subsequently, flowchart 1400 ends in step 1430.

In step 1424, initiator 102 determines whether the reciprocal MIMO phase is intended to be applied to MU-MIMO BF training. In a case where the reciprocal MIMO phase is intended to be applied to MU-MIMO BF training (Yes in step 1424), flowchart 1400 proceeds to step 1428. Otherwise (No in step 1424), flowchart 1400 proceeds to step 1426.

In step 1428, the non-reciprocal/reciprocal MIMO phase field of MIMO setup control element 1300 is set to 1 to indicate that the reciprocal MIMO phase (see FIG. 11) is applied to MU-MIMO BF training, and subsequently flowchart 1400 ends in step 1430.

Figure 20:
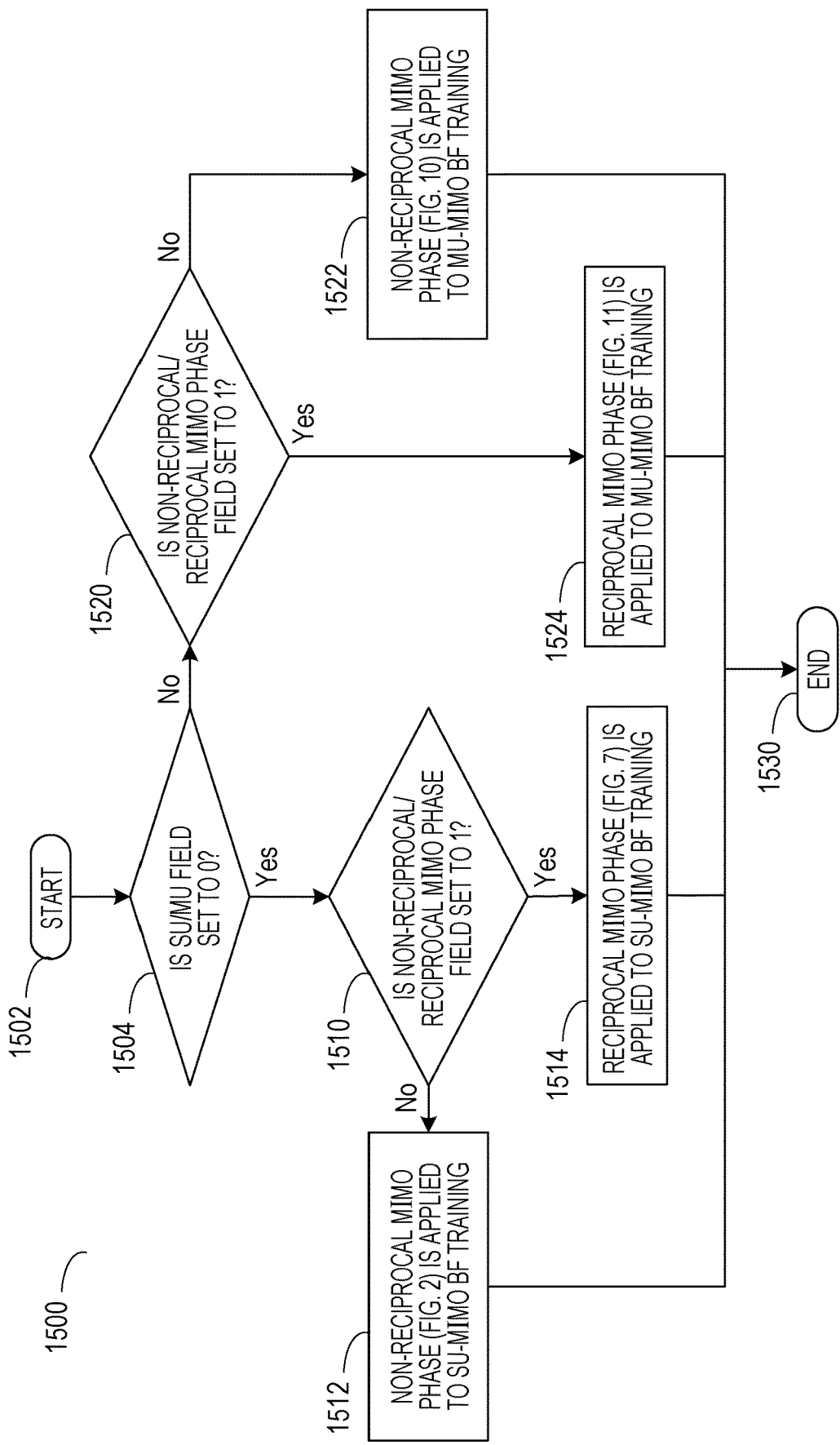
FIG. 20 is a flowchart for interpreting the information fields of the MIMO setup control element according to Embodiment 2.

FIG. 20 illustrates flowchart 1500 for interpreting the information fields of MIMO setup control element 1300 according to Embodiment 2. Flowchart 1500 starts from step 1502. In step 1504, responder 104 that has received MIMO setup control element 1300 checks whether the SU/MU field is set to 0. In a case where the SU/MU field is set to 0 (Yes in step 1504), flowchart 1500 proceeds to step 1510. Otherwise (No in step 1504), flowchart 1500 proceeds to step 1520.

In step 1510, responder 104 checks whether the non-reciprocal/reciprocal MIMO phase field of received MIMO setup control element 1300 is set to 1. In a case where the non-reciprocal/reciprocal MIMO phase field is set to 1 (Yes in step 1510), flowchart 1500 proceeds to step 1514. Otherwise (No in step 1510), flowchart 1500 proceeds to step 1512.

In step 1514, responder 104 determines that the reciprocal MIMO phase is applied to SU-MIMO BF training, and flowchart 1500 ends in step 1530. In step 1512, responder 104 determines that non-reciprocal MIMO phase is applied to SU-MIMO BF training, and flowchart 1500 ends in step 1530.

In step 1520, responder 104 checks whether the non-reciprocal/reciprocal MIMO phase field of received MIMO setup control element 1300 is set to 1. In a case where the non-reciprocal/reciprocal MIMO phase field is set to 1 (Yes in step 1520), flowchart 1500 proceeds to step 1524. Otherwise (No in step 1520), flowchart 1500 proceeds to step 1522.

In step 1524, responder 104 determines that the reciprocal MIMO phase is applied to MU-MIMO BF training, and flowchart 1500 ends in step 1530. In step 1522, responder 104 determines that the non-reciprocal MIMO phase is applied to MU-MIMO BF training, and flowchart 1500 ends in step 1530.

According to Embodiment 2, one signal transmission bit in a MIMO setup control element can be saved compared with Embodiment 1.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

A communication system according to the present disclosure (an initiator device and a responder device) can be used for communication between vehicles, communication between a road and a vehicle, communication between a vehicle and a store, communication between a train and a station platform, and communication between an aircraft and a boarding bridge (passenger step).

An initiator device according to the present disclosure is a device that supports a single user (SU)-multiple input multiple output (MIMO) operation, including: a generation circuit that generates a first signal including a value indicating which of a reciprocal MIMO phase and a non-reciprocal MIMO phase is applied to SU-MIMO beamforming (BF) training; and a transmission circuit that transmits the first signal to a responder device.

In the initiator device according to the present disclosure, in a case where both the initiator device and the responder device have antenna pattern reciprocity, the first signal includes a value indicating that the reciprocal MIMO phase is applied to the SU-MIMO BF training.

In the initiator device according to the present disclosure, the first signal is a MIMO BF setup frame.

The initiator device according to the present disclosure includes: a reception circuit; and a control circuit, in which, in a case where the reciprocal MIMO phase is applied to the SU-MIMO BF training, the transmission circuit transmits to the responder device a first beam refinement protocol (BRP) signal for training transmit sectors that are to be used for MIMO transmission by the initiator device, the reception circuit receives from the responder device a first MIMO BF feedback signal including feedback information for the first BRP signal, and the control circuit determines, on the basis of the feedback information for the first BRP signal, a transmit sector combination and a receive sector combination that are to be used for MIMO transmission by the initiator device.

In the initiator device according to the present disclosure, in a digital BF procedure of a hybrid BF operation that is performed after the SU-MIMO BF training, the reception circuit receives from the responder device a second BRP signal for training a transmit sector combination that is to be used for MIMO transmission by the responder device, and the transmission circuit transmits to the responder device a second MIMO BF feedback signal including feedback information for the second BRP signal.

In the initiator device according to the present disclosure, the reception circuit receives from the responder device a training (TRN) signal for training a transmit sector combination that is to be used for MIMO transmission by the responder device, the TRN signal being added to the first MIMO BF feedback signal, and the transmission circuit transmits to the responder device a third MIMO BF feedback signal including feedback information for the TRN signal.

In the initiator device according to the present disclosure, the first signal includes information indicating a transmission power of the transmit sector combination.

In the initiator device according to the present disclosure, in a case where the reciprocal MIMO phase is applied to the SU-MIMO BF training, the reception circuit receives from the responder device a third BRP signal for training a transmit sector combination that is to be used for MIMO transmission by the responder device, the transmission circuit transmits to the responder device a third MIMO BF feedback signal including feedback information for the third BRP signal, and the control circuit determines, on the basis of the third BRP signal, a transmit sector combination and a receive sector combination that are to be used for MIMO transmission by the initiator device.

In the initiator device according to the present disclosure, in a digital BF procedure of a hybrid BF operation that is performed after the SU-MIMO BF training, the reception circuit receives from the responder device a fourth BRP signal with which the responder device sounds a channel for a responder link, and the transmission circuit transmits to the responder device a fourth MIMO BF feedback signal including feedback information for the fourth BRP signal.

A responder device according to the present disclosure is a device that supports a single user (SU)-multiple input multiple output (MIMO) operation, including: a reception circuit that receives from an initiator device a first signal including a value indicating which of a reciprocal MIMO phase and a non-reciprocal MIMO phase is applied to SU-MIMO beamforming (BF) training; and a processing circuit that determines, on the basis of the value, which of the reciprocal MIMO phase and the non-reciprocal MIMO phase is applied to the SU-MIMO BF training.

In the responder device according to the present disclosure, the first signal is a MIMO BF setup signal.

The responder device according to the present disclosure includes: a transmission circuit; and a control circuit, in which, in a case where the processing circuit determines that the reciprocal MIMO phase is applied to the SU-MIMO BF training, the reception circuit receives from the initiator device a first beam refinement protocol (BRP) signal for training a transmit sector combination that is to be used for MIMO transmission by the initiator device, the transmission circuit transmits to the initiator device a first MIMO BF feedback signal including feedback information for the first BRP signal, and the control circuit determines, on the basis of the first BRP signal, a transmit sector combination and a receive sector combination that are to be used for MIMO transmission by the responder device.

In the responder device according to the present disclosure, in a digital BF procedure of a hybrid BF operation that is performed after the SU-MIMO BF training, the transmission circuit transmits to the initiator device a second BRP signal for training a transmit sector combination that is to be used for MIMO transmission by the responder device, the reception circuit receives from the initiator device a second MIMO BF feedback signal including feedback information for the second BRP signal, and the control circuit determines, on the basis of the feedback information for the second BRP signal, a modulation and coding scheme for MIMO transmission by the responder device.

In the responder device according to the present disclosure, the transmission circuit transmits to the initiator device a training (TRN) signal for training a transmit sector combination that is to be used for MIMO transmission by the responder device, the TRN signal being added to the first MIMO BF feedback signal, the reception circuit receives from the responder device a third MIMO BF feedback signal including feedback information for the TRN signal, and the control circuit determines, on the basis of the feedback information for the TRN signal, a modulation and coding scheme for MIMO transmission by the responder device.

In the responder device according to the present disclosure, the first signal includes information indicating a transmission power of the transmit sector combination, and the control circuit determines, on the basis of the information indicating the transmission power, a modulation and coding scheme for MIMO transmission by the responder device.

In the responder device according to the present disclosure, in a case where the processing circuit determines that the reciprocal MIMO phase is applied to the SU-MIMO BF training, the transmission circuit transmits to the initiator device a third BRP signal for training a transmit sector combination that is to be used for MIMO transmission by the responder device, the reception circuit receives from the responder device a third MIMO BF feedback signal including feedback information for the third BRP signal, and the control circuit determines, on the basis of the feedback information for the third BRP signal, a transmit sector combination and a receive sector combination that are to be used for MIMO transmission by the responder device.

In the responder device according to the present disclosure, in a digital BF procedure of a hybrid BF operation that is performed after the SU-MIMO BF training, the transmission circuit transmits to the initiator device a fourth BRP signal with which the responder device sounds a channel for a responder link, the reception circuit receives from the initiator device a fourth MIMO BF feedback signal including feedback information for the fourth BRP signal, and the control circuit determines, on the basis of the feedback information for the fourth BRP signal, a modulation and coding scheme for MIMO transmission by the responder device.

A system according to the present disclosure includes: an initiator device and a responder device that support a single user (SU)-multiple input multiple output (MIMO) operation, in which the initiator device includes a generation circuit that generates a first signal including a value indicating which of a reciprocal MIMO phase and a non-reciprocal MIMO phase is applied to SU-MIMO beamforming (BF) training, and a transmission circuit that transmits the first signal to the responder device, and in which the responder device includes a reception circuit that receives the first signal from the initiator device, and a processing circuit that determines, on the basis of the value, which of the reciprocal MIMO phase and the non-reciprocal MIMO phase is applied to the SU-MIMO BF training.

This patent application claims priority based on U.S. Provisional Patent Application No. 62/575,264 filed on Oct. 20, 2017, U.S. Provisional Patent Application No. 62/628, 199 filed on Feb. 8, 2018, and Japanese Patent Application No. 2018-172815 filed on Sep. 14, 2018, which are hereby incorporated by reference herein in their entirety.

INDUSTRIAL APPLICABILITY

The present disclosure is useful for a multi-user wireless communication system.

REFERENCE SIGNS LIST

800 STA
810 Transmission signal generation circuit
812 Message generation circuit 820 Transceiver
822 PHY processing circuit
824 Antenna
830 Received signal processing circuit
832 Message processing circuit
840 Control circuit
842 BF control circuit

The invention claimed is:

1. An initiator device that supports a single user (SU)-multiple input multiple output (MIMO) operation, comprising:
a generation circuit that generates a MIMO beamforming (BF) setup frame including a non-reciprocal/reciprocal MIMO phase field that indicates which of a non-reciprocal MIMO phase or a reciprocal MIMO phase is applied to SU-MIMO BF training;
a transmission circuit that transmits the MIMO BF setup frame to a responder device and that, in response to the non-reciprocal/reciprocal MIMO phase field indicating that the reciprocal MIMO phase is applied, transmits to the responder device a plurality of first beam refinement protocol (BRP) signals for training transmit sectors that are to be used for MIMO transmission by the initiator device; and
a reception circuit that receives from the responder device a first MIMO BF feedback frame without receiving a second BRP signal from the responder device, the first MIMO BF feedback frame including feedback information for the plurality of first BRP signals.

2. The initiator device according to claim 1, wherein in response to the initiator device and the responder device having antenna pattern reciprocity, the non-reciprocal/reciprocal MIMO phase field included in the MIMO BF setup frame is set to a first value indicating that the reciprocal MIMO phase is applied to the SU-MIMO BF training.

3. The initiator device according to claim 1, comprising:
a control circuit that determines, on the basis of the feedback information for the plurality of first BRP signals, a transmit sector combination and a receive sector combination for an initiator link.

4. The initiator device according to claim 3, wherein
in a digital BF procedure of a hybrid BF operation that is performed after the SU-MIMO BF training,
the reception circuit receives from the responder device a plurality of second BRP signals for training a transmit sector combination that is to be used for MIMO transmission by the responder device, and
the transmission circuit transmits to the responder device a second MIMO BF feedback frame including feedback information for the plurality of second BRP signals.

5. The initiator device according to claim 3, wherein
the reception circuit receives from the responder device a training (TRN) signal for training a transmit sector combination that is to be used for MIMO transmission by the responder device, the TRN signal being added to the first MIMO BF feedback frame, and
the transmission circuit transmits to the responder device a third MIMO BF feedback frame including feedback information for the TRN signal.

6. The initiator device according to claim 3, wherein
in response to the non-reciprocal/reciprocal MIMO phase field indicating that the reciprocal MIMO phase is applied to the SU-MIMO BF training,
the reception circuit receives from the responder device a plurality of third BRP signals for training a transmit sector combination that is to be used for MIMO transmission by the responder device,
the transmission circuit transmits to the responder device a third MIMO BF feedback frame including feedback information for the plurality of third BRP signals, and
the control circuit determines, on the basis of the plurality of third BRP signals, a transmit sector combination and a receive sector combination that are to be used for MIMO transmission by the initiator device.

7. The initiator device according to claim 6, wherein
in a digital BF procedure of a hybrid BF operation that is performed after the SU-MIMO BF training,
the reception circuit receives from the responder device a plurality of fourth BRP signals with which the responder device sounds a channel for a responder link, and
the transmission circuit transmits to the responder device a fourth MIMO BF feedback frame including feedback information for the plurality of fourth BRP signals.

8. A communication method for an initiator device that supports a single user (SU)-multiple input multiple output (MIMO) operation, the communication method comprising:
generating a MIMO beamforming (BF) setup frame including a non-reciprocal/reciprocal MIMO phase field that indicates which of a non-reciprocal MIMO phase or a reciprocal MIMO phase is applied to SU-MIMO BF training;
transmitting the MIMO BF setup frame to a responder device and, in response to the non-reciprocal/reciprocal MIMO phase field indicating that the reciprocal MIMO phase is applied, transmitting to the responder device a plurality of first beam refinement protocol (BRP) signals for training transmit sectors that are to be used for MIMO transmission by the initiator device; and
receiving from the responder device a first MIMO BF feedback frame without receiving a second BRP signal from the responder device, the first MEMO BF feedback frame including feedback information for the plurality of first BRP signals.

9. The communication method according to claim 8, wherein in response to the initiator device and the responder device having antenna pattern reciprocity, the non-reciprocal/reciprocal MIMO phase field included in the MIMO BF setup frame is set to a first value indicating that the reciprocal MIMO phase is applied to the SU-MIMO BF training.

10. The communication method according to claim 8, comprising:
determining, on the basis of the feedback information for the plurality of first BRP signals, a transmit sector combination and a receive sector combination for an initiator link.

11. The communication method according to claim 10, comprising:
in a digital BF procedure of a hybrid BF operation that is performed after the SU-MIMO BF training,
receiving from the responder device a plurality of second BRP signals for training a transmit sector combination that is to be used for MIMO transmission by the responder device; and
transmitting to the responder device a second MIMO BF feedback frame including feedback information for the plurality of second BRP signals.

12. The communication method according to claim 10, comprising:
receiving from the responder device a training (TRN) signal for training a transmit sector combination that is to be used for MIMO transmission by the responder device, the TRN signal being added to the first MIMO BF feedback frame, and transmitting to the responder device a third MIMO BF feedback frame including feedback information for the TRN signal.

13. The communication method according to claim 10, comprising:
  in response to the non-reciprocal/reciprocal MIMO phase field indicating that the reciprocal MIMO phase is applied to the SU-MIMO BF training,
  receiving from the responder device a plurality of third BRP signals for training a transmit sector combination that is to be used for MIMO transmission by the responder device;
  transmitting to the responder device a third MIMO BF feedback frame including feedback information for the plurality of third BRP signals; and
  determining, on the basis of the plurality of third BRP signals, a transmit sector combination and a receive sector combination that are to be used for MIMO transmission by the initiator device.

14. The communication method according to claim 13, comprising:
  in a digital BF procedure of a hybrid BF operation that is performed after the SU-MIMO BF training,
  receiving from the responder device a plurality of fourth BRP signals with which the responder device sounds a channel for a responder link; and
  transmitting to the responder device a fourth MIMO BF feedback frame including feedback information for the plurality of fourth BRP signals.

15. The initiator device according to claim 1, wherein the reception circuit receives the first MIMO BF feedback frame without receiving the second BRP signal from the responder device in a case where the non-reciprocal/reciprocal MIMO phase field indicates the reciprocal MIMO phase is applied to the SU-MIMO BF training.

* * * * *